United States Patent
Tokunari et al.

(10) Patent No.: US 12,436,444 B2
(45) Date of Patent: Oct. 7, 2025

(54) ELECTRO-OPTOMECHANICAL QUANTUM TRANSDUCTION

(71) Applicant: International Business Machines Corporation, Armonk, NY (US)

(72) Inventors: Masao Tokunari, Kanagawa (JP); Ryan Daniel Schilling, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 953 days.

(21) Appl. No.: 17/563,343

(22) Filed: Dec. 28, 2021

(65) Prior Publication Data
US 2023/0204861 A1 Jun. 29, 2023

(51) Int. Cl.
*G02F 2/02* (2006.01)
*G02B 1/00* (2006.01)
(Continued)

(52) U.S. Cl.
CPC ............... *G02F 2/02* (2013.01); *G02B 1/002* (2013.01); *G02F 1/011* (2013.01); *G02F 1/0128* (2013.01);
(Continued)

(58) Field of Classification Search
CPC .......... G02F 1/353; G02F 2/02; G02F 1/0126; G02F 1/0134; G06N 10/40; G02B 6/12; G02B 6/122; G02B 6/1225
See application file for complete search history.

(56) References Cited

U.S. PATENT DOCUMENTS

| 5,682,455 A * | 10/1997 | Kovacic ............... G02B 6/10 257/E31.128 |
| 8,600,200 B1 | 12/2013 | Rakich et al. |

(Continued)

FOREIGN PATENT DOCUMENTS

CN 107697883 2/2018

OTHER PUBLICATIONS

G. Arnold et al. Converting microwave and telecom photons with a silicon photonic nanomechanical interface. Nature Communications, 11, Sep. 8, 2020. (https://doi.org/10.1038/s41467-020-18269-z) (Year: 2020).*

(Continued)

*Primary Examiner* — Michael Stahl
(74) *Attorney, Agent, or Firm* — Amin, Turocy & Watson, LLP

(57) ABSTRACT

Techniques for creating an SiGe/Si electro-optomechanical quantum transducer, comprising an SiGe/Si optical ring resonator and capacitor, that can be associated with a qubit are presented. The optical resonator, comprising an SiGe optical waveguide and a strained silicon membrane, can be formed and disposed over a substrate. The strained silicon membrane can have a photoelastic coupling with the SiGe optical waveguide. A capacitor, comprising a superconducting material, can be formed in proximity to the optical resonator. The top plate of the capacitor can be associated with the strained silicon membrane. A recessed region can be formed in the back side of the substrate along a desired silicon plane, extending to form a hole in the top side of the substrate. A superconducting material can be applied along substrate surfaces defining the recessed region and hole. The superconducting material covering the hole can be the bottom plate of the capacitor.

20 Claims, 12 Drawing Sheets

(51) Int. Cl.
*G02F 1/01* (2006.01)
*G02F 1/35* (2006.01)
*G06N 10/40* (2022.01)

(52) U.S. Cl.
CPC ............ *G02F 1/0134* (2013.01); *G02F 1/353* (2013.01); *G06N 10/40* (2022.01)

(56) References Cited

U.S. PATENT DOCUMENTS

| | | | |
|---|---|---|---|
| 8,816,325 B2 | 8/2014 | Schenkel et al. | |
| 9,059,388 B2 | 6/2015 | Tahan et al. | |
| 10,578,891 B1* | 3/2020 | Schmeing | H04B 10/70 |
| 10,866,214 B2 | 12/2020 | Duraffourg et al. | |
| 2005/0161749 A1 | 7/2005 | Yang et al. | |
| 2014/0314419 A1* | 10/2014 | Paik | H04B 10/70 398/115 |
| 2015/0060650 A1* | 3/2015 | Park | B82Y 20/00 250/214.1 |
| 2015/0060756 A1* | 3/2015 | Park | B82Y 20/00 257/9 |
| 2016/0079953 A1 | 3/2016 | Wenzler et al. | |
| 2017/0227795 A1* | 8/2017 | Bishop | G02F 1/011 |
| 2018/0003753 A1* | 1/2018 | Bishop | G06N 20/00 |
| 2018/0034550 A1* | 2/2018 | Rakich | H04B 10/516 |
| 2019/0270635 A1* | 9/2019 | Painter | H10D 48/3835 |
| 2020/0243601 A1* | 7/2020 | Orcutt | H10N 60/805 |
| 2021/0278745 A1* | 9/2021 | Groeblacher | G02F 2/02 |

OTHER PUBLICATIONS

J. Orcutt et al. Engineering electro-optics in SiGe / Si waveguides for quantum transduction. Quantum Science and Technology, 5:3, May 5, 2020. (https://doi.org/10.1088/2058-9565/ab84c1) (Year: 2020).*

Chatterjee et al., "Nanomechanical Proximity Perturbation for Switching in Silicon-Based Directional Couplers for High-Density Photonic Integrated Circuits," Journal of Microelectromechanical Systems, vol. 19, No. 3, Jun. 2010, 6 pages.

Tsaturyan et al., "Ultra-coherent nanomechanical resonators via soft clamping and dissipation dilution," arXiv:1608.00937v1 [quant-ph] Aug. 2, 2016, 10 pages.

Xie et al., "Tunable exciton-optomechanical coupling in suspended monolayer MoSe2," Mesoscale and Nanoscale Physics, 10.1021/acs.nanolett.0c05089, 21 pages.

Lauk et al., "Perspectives on quantum transduction," arXiv:1910.04821v1 [quant-ph] Oct. 10, 2019, 13 pages.

Sadeghi et al., "Influence of clamp-widening on the quality factor of nanomechanical silicon nitride resonators," Journal of Applied Physics, 2019, 10 pages.

* cited by examiner

ELECTRO-OPTOMECHANICAL QUANTUM TRANSDUCTION

BACKGROUND

The subject disclosure relates to quantum circuitry, and more specifically, to an electro-optomechanical quantum transduction. Quantum transduction can involve conversion of quantum signals from one form of energy to another form of energy. As an example, quantum transduction can involve conversion of energy associated with microwave photons to a different form of energy associated with optical photons. Optomechanical coupling can involve an interaction between a mechanical vibrational mode of a mechanical subsystem and an optical radiation field of an optical subsystem. For example, when there is an optomechanical coupling between a mechanical subsystem (e.g., mechanical resonator) and an optical subsystem, vibration in the mechanical subsystem can cause a change (e.g., a corresponding change) in an optical radiation field of the optical subsystem.

The above-described background description is merely intended to provide a contextual overview regarding quantum transduction and optomechanical coupling, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, methods, apparatuses, and/or computer program products that can facilitate creating, designing, and/or utilizing electro-optomechanical quantum transducers that can be associated with qubits in quantum computers are presented.

According to an embodiment, a system can comprise a resonator comprising a silicon-germanium optical waveguide and a silicon membrane that can have a photoelastic coupling with the silicon-germanium optical waveguide. The system also can comprise a capacitor comprising a top plate associated with the silicon membrane and a bottom plate associated with a substrate. Such embodiments of the system can provide a number of advantages, including that the system can enhance the efficiency and reliability of the performance of resonators, and increase the bandwidth of resonators.

In some embodiments, the system also can comprise that the silicon membrane can comprise a strained silicon material that can be crystalline, wherein a portion of the silicon membrane can have a phononic crystal membrane structure. The silicon membrane can have the photoelastic coupling, a strained coupling, or a radiation pressure coupling with the silicon-germanium optical waveguide. In yet other embodiments, the resonator can be a silicon-germanium, silicon optical ring resonator that comprises a silicon-germanium core component, comprising the silicon-germanium optical waveguide, coupled to a silicon cladding structure of the silicon membrane. Such embodiments of the system can provide a number of advantages, including that the system can desirably enhance the optical quality factor and mechanical quality factor of resonators.

Another embodiment relates to a device that can comprise a resonator that can comprise a silicon-germanium optical waveguide and a strained silicon membrane that can have a strained coupling with the silicon-germanium optical waveguide. The device also can comprise a capacitor comprising a top plate associated with the silicon membrane and a bottom plate associated with a substrate. Such embodiments of the device can provide a number of advantages, including that the device can enhance the efficiency and reliability of the performance of resonators, and increase the bandwidth of resonators.

In some embodiments, the device can comprise a microwave resonator that can be associated with the top plate of the capacitor, where the microwave resonator can be usable to sense photons at a microwave frequency level. In still other embodiments, the device can comprise that the silicon membrane can comprise a strained silicon material that can be crystalline, where a portion of the silicon membrane can have a phononic crystal membrane structure. The silicon membrane can have the strained coupling, a photoelastic coupling, or a radiation pressure coupling with the silicon-germanium optical waveguide. In yet other embodiments, the device can comprise that the resonator can be a nanomechanical silicon-germanium, silicon optical ring resonator that can comprise a silicon-germanium core component, comprising the silicon-germanium optical waveguide, coupled to a silicon cladding structure of the silicon membrane. Such embodiments of the device can provide a number of advantages, including that the device can desirably enhance the optical quality factor and mechanical quality factor of resonators.

A further embodiment relates to a method that can comprise forming a resonator comprising a silicon-germanium optical waveguide and a strained silicon membrane, wherein the strained silicon membrane has a photoelastic coupling with the silicon-germanium optical waveguide. The method also can comprise forming a capacitor comprising a top plate associated with the silicon membrane and a bottom plate associated with a substrate. Such embodiments of the method can provide a number of advantages, including that the method can enhance the efficiency and reliability of the performance of resonators, and increase the bandwidth of resonators.

These and other features will become apparent from the following detailed description of illustrative embodiments thereof, which is to be read in connection with the accompanying drawings.

DETAILED DESCRIPTION

Figure 1:
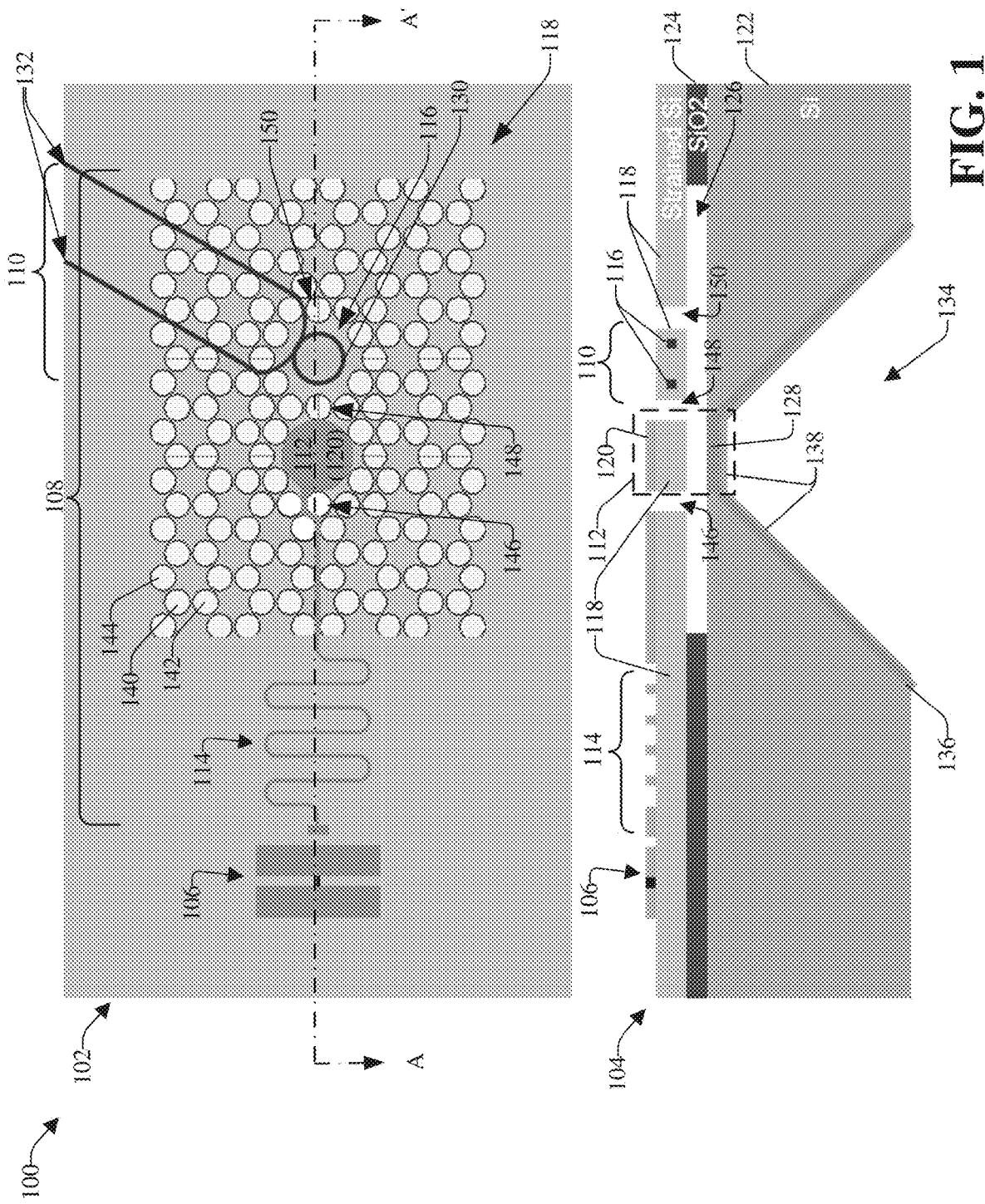
FIG. 1 illustrates a diagram of a top view and a side view of an example, non-limiting device that can comprise a quantum transducer associated with a qubit, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computers can comprise a group of qubits that can perform quantum operations on data. Operation of qubits in quantum computers can involve a microwave field comprising photons that can be generated at microwave frequency levels. These photons can be encoding the state of the quantum computer. In connection with the quantum operations being performed, it can be desirable to sense or read charges of qubits.

To further scale up superconducting quantum computers, microwave to optical quantum transduction using optomechanical coupling has been explored as a potential technology for use in quantum transduction. Existing approaches relating to optomechanical resonators and quantum transduction can have a number of deficiencies that can render them undesirable for use with quantum computers.

One existing approach relates to forming nanomechanical resonators, where a thin silicon nitride film is deposited on a silicon wafer. The film is patterned with a honeycomb lattice of air holes over a square region, the silicon nitride membrane being patterned with a phononic crystal structure. However, this existing technology can be undesirably inefficient, deficient with regard to bandwidth, deficient with regard to optical and microwave properties (e.g., can have relatively poor optical and microwave properties), unreliable, difficult to implement or scale up, bulky with regard to the overall structure that would have to be used to implement the resonator, and incompatible for use with superconducting quantum computers.

Another existing approach involves an optomechanical resonator that is formed by an optical resonator, a mechanical element for being set in rapid oscillations, by an optical signal confined in the optomechanical resonator, and in slow oscillations, by an acoustic wave generated in the photoacoustic cavity. The optomechanical resonator can be part of a photoacoustic sensor. Such existing approach, however, can be undesirably deficient with regard to optical quality and mechanical quality, and undesirable for use for quantum transduction purposes, even if it ostensibly may be used for sensing acoustic modes.

Still another existing approach involves a nano-optomechanical transducer, comprising a suspended membrane; a transducing optical waveguide, mechanically coupled to the suspended membrane; and an input optical signal that is coupled into the transducing optical waveguide, wherein the input optical signal generates an acoustic wave that propagates in the suspended membrane. The optical waveguide can be embedded in a low-Z phononic crystal membrane. The transducing optical waveguide also can be part of a signal delay system with an array of receiving waveguides, wherein an encoded input optical signal is injected in the transducing optical waveguide that generates an acoustic wave comprising the encoded information. The acoustic signal propagates in a phononic membrane and reaches a receiving optical waveguide after a time delay. This existing approach, however, merely uses a membrane to couple a transducing optical waveguide to another optical waveguide for the purpose of creating a signal delay.

These and other deficiencies of existing approaches relating to resonators can result in deficient, ineffective, unreliable, or otherwise undesirable performance of resonators with regard to quantum transduction and use with quantum computers.

It can be desirable to enhance (e.g., increase, improve, or optimize) the efficiency and reliability of the performance of resonators, enhance the optical quality factor and mechanical quality factor of resonators, create quantum transducers, comprising the resonators, that can be suitable for use with quantum computers, and enhance the bandwidth available from resonators to communicate information (e.g., sensed charge of qubits, state of the qubits, or other information) from a quantum computer. It also can be desirable to have quantum transducers that can read out information from a quantum computer such that the information can be transferred out of the very cold temperature state of the cryostat chamber where the quantum computer can reside to a room temperature environment where the information can be provided to another quantum computer or utilized for other desired applications.

To that end, various embodiments described herein relate to techniques for designing, creating, and/or utilizing a silicon-germanium (SiGe)/silicon (Si) electro-optomechanical quantum transducer, comprising an SiGe/Si optical ring resonator (also referred to herein as optical resonator) and capacitor, that can be associated with (e.g., electronically and communicatively connected to) a qubit of a quantum computer. The SiGe/Si electro-optomechanical quantum transducer can comprise the optical ring resonator, a mechanical resonator (e.g., silicon membrane), and a microwave resonator, wherein the optical ring resonator can be coupled to the mechanical resonator, and the mechanical resonator can be coupled to the microwave resonator, to facilitate performing desirable quantum transduction, such as more fully described herein. In some embodiments, the quantum computer can comprise a group of qubits, comprising a desired number of qubits, that can be respectively associated with SiGe/Si electro-optomechanical quantum transducers.

The optical resonator can comprise an SiGe optical waveguide and a strained (e.g., tensile strained or compressive strained) silicon membrane associated with the SiGe optical waveguide. The optical resonator can be formed and disposed over a substrate (e.g., in a chip stack comprising various layers of materials, such as described herein). The strained silicon membrane, which can be a crystalline silicon material, can have a photoelastic, strained, and/or radiation pressure coupling with the SiGe optical waveguide. The strained silicon membrane can be a desirably high prestressed soft clamping membrane and desirable cladding structure that can provide desirable cladding for the optical waveguide of the optical resonator. This cladding structure of the strained silicon membrane can desirably enhance (e.g., improve, increase, and/or optimize) the optical quality factor ($Q_O$) of the optical resonator to achieve a desirably high $Q_O$. In some embodiments, the strained silicon membrane can be grown (e.g., epitaxial growth), using, for example, a desired epitaxial process, to have the strained silicon membrane surround and embed the SiGe optical waveguide (e.g., the SiGe ring structure) of the optical resonator and thereby provide a desirable cladding structure that can surround the SiGe optical waveguide. This surrounding cladding structure of the strained silicon membrane can desirably further enhance the $Q_O$ of the optical resonator to achieve an even higher $Q_O$ for the optical resonator. It is to be appreciated and understood that, while some embodiments described herein involve a strained silicon membrane, in other embodiments, the optical resonator can comprise an unstrained silicon membrane instead of a strained silicon membrane, if and as desired.

A capacitor (e.g., parallel plate capacitor or other desired type of capacitor), comprising a superconducting material (e.g., niobium (Nb), a Nb-based superconducting material, aluminum (Al), Al-based superconducting material, or another desired superconducting material), can be formed in proximity to the optical resonator. The top plate of the capacitor (e.g., parallel plate capacitor) can be associated with (e.g., deposited and/or formed on) the strained silicon membrane. In some embodiments, a recessed region can be formed in the back side of the substrate along the Si[111] plane of the substrate, extending to form a hole in the top side of the substrate. In other embodiments, the recessed region can be formed in the back side of the substrate along a different silicon plane (e.g., Si[100] plane, Si[110] plane, or other desired type of silicon plane) of the substrate, extending to form a hole in the top side of the substrate. A superconducting material can be applied (e.g., deposited) along substrate surfaces that can define the recessed region and the hole in the substrate. The superconducting material applied to cover the hole can be the bottom plate of the capacitor. In certain embodiments, a desired supporting material (e.g., silicon or silicon-based material) can be deposited on the superconducting material that makes up the bottom electrode, including the bottom plate of the capacitor, in the recessed region on the back side of the substrate. This can facilitate reinforcing the bottom plate of the capacitor to prevent or inhibit (e.g., reduce or minimize) movement of the bottom plate and maintain the integrity of the bottom plate of the capacitor.

In connection with forming the top plate of the capacitor, the superconducting material can be deposited on the strained silicon membrane and patterned to form the top plate of the capacitor, a microwave resonator, and superconducting components (e.g., qubit capacitor and other qubit components) of the qubit. One or more Josephson junctions of the qubit also can be formed using a desired qubit formation process. The microwave resonator can be between and connected to the qubit and the top plate of the capacitor. In certain embodiments, the microwave resonator can be or can comprise an inductor. In some embodiments, the strained silicon membrane also can be further processed by patterning holes in the strained silicon membrane (e.g., in a periodic pattern) to desirably form a phononic crystal structure, which can further increase the mechanical quality factor ($Q_m$) of the strained silicon membrane.

In certain embodiments, the SiGe/Si electro-optomechanical quantum transducer, comprising the SiGe/Si optical ring resonator, the capacitor, and the microwave resonator, as well as the qubit and associated components and circuitry, can be formed on a single die (e.g., a single integrated circuit (IC) chip). For instance, a device formation component (e.g., employing the disclosed device formation process) can form a group of qubits, comprising a desired number of qubits, and a group of SiGe/Si electro-optomechanical quantum transducers, associated with the group of qubits, on a single die.

Photons at relatively lower microwave frequency levels, such as those photons that can be produced in the quantum computer while in the very cold environment of the cryostat chamber, typically can rapidly and undesirably decohere when in a room temperature environment, and thermal or background noise associated with the transmission of these photons at such lower microwave frequency levels can be undesirably high at room temperature (e.g., bias line transmission of such microwave signals can introduce an undesirably high level of thermal or background noise). The SiGe/Si electro-optomechanical quantum transducer can desirably sense or read the photons, which can be at microwave frequency levels, and which can represent or indicate the state of the associated qubit and can, through the electro-optomechanical quantum transducer processing by the SiGe/Si electro-optomechanical quantum transducer, generate optical photons at a desirably higher frequencies. Such optical photons at the higher frequencies can desirably be output to and exist in a coherent or quantum state in a room temperature environment, and can be utilized or further processed for various applications, such as described herein.

The disclosed SiGe/Si electro-optomechanical quantum transducer can have a number of advantages over existing technology. For instance, such quantum transducer can have a desirably (e.g., significantly) higher $Q_O$ and desirably higher $Q_m$ than existing transducers with a desirable microwave property. The disclosed SiGe/Si electro-optomechanical quantum transducer also can have desirably low mechanical dissipation at low temperature. The disclosed SiGe/Si electro-optomechanical quantum transducer also can be desirably compact, as such quantum transducer, associated qubit, and associated circuitry can be formed on a single IC chip, and can be compatible with superconducting quantum computers.

These and other aspects and embodiments of the disclosed subject matter will now be described with respect to the drawings.

FIG. 1 illustrates a diagram of a top view and a side view (e.g., side cross-sectional view) of an example, non-limiting device 100 that can comprise a quantum transducer associated with a qubit, in accordance with various aspects and embodiments of the disclosed subject matter. The diagrams can comprise a top view 102 of the device 100 and a side cross-sectional view 104 (A-A') of the device 100. The device 100 can comprise a system of various components and circuitry that can be arranged to perform one or more desired functions, such as described herein. The device 100 (e.g., qubit device, or multi-qubit device or package) can have dimensions (e.g., the IC chip of the device 100 can have dimensions) that can vary, wherein the length of the device 100 can range, for example, from on the order of millimeters to on the order of tens of millimeters, the width of the device 100 can range, for example, from on the order of millimeters to on the order of tens of millimeters, and the thickness can range, for example, from approximately 1 millimeter (mm) to approximately 3 mm. It is to be appreciated and understood that these dimensions of the device 100 are exemplary, and, in accordance with other embodiments, the device 100 can have different (e.g., smaller or larger) dimensions than the example dimensions described herein.

In some embodiments, the device 100 can comprise a qubit 106 that can be formed on a chip stack formed on a die (e.g., IC chip). The qubit 106 can be one of a group of qubits of a quantum computer (e.g., superconducting quantum computer). In certain embodiments, the qubit 106 can be a transmon qubit, although, in other embodiments, the qubit 106 can be a different type of qubit. The qubit 106 can comprise, for example, one or more Josephson junctions and a shunt capacitor that can be associated with the one or more Josephson junctions.

In accordance with various embodiments, the device formation component (not shown in FIG. 1; and such as more fully described herein) can create, design, or form an SiGe/Si electro-optomechanical quantum transducer 108 (also referred to herein as quantum transducer), comprising an SiGe/Si optical ring resonator 110 (also referred to herein as optical resonator or optical ring resonator), a capacitor 112, a microwave resonator 114, and other components and circuitry, that can be associated with (e.g., electronically and communicatively connected to) the qubit 106 and formed on the same chip stack and die as the qubit 106 (and/or other qubits and associated SiGe/Si electro-optomechanical quantum transducers on the same chip stack and die). The optical ring resonator 110 can comprise an SiGe optical waveguide 116 and a strained (e.g., a tensile strained) silicon membrane 118 that can be associated with (e.g., connected to) the SiGe optical waveguide 116 and a top plate 120 of the capacitor 112. The strained silicon membrane 118 can have a desirable (e.g., suitable, enhanced, or optimal) photoelastic or strained coupling with the SiGe optical waveguide 116, such as described herein. The SiGe optical waveguide 116 can have desired dimensions. In some embodiments, the SiGe optical waveguide 116 can have dimensions, such as a width of 3.0 micrometers (μm) and a thickness of 100 nanometers (nm), although, in other embodiments, the SiGe optical waveguide 116 can have a width that can be greater or less than 3.0 μm and/or a thickness that can be greater or less than 100 nm. The strained silicon membrane 118 also can have desired dimensions. In certain embodiments, the strained silicon membrane 118 can be a relatively thin membrane and can have a thickness of 50 nm, although, in other embodiments, the strained silicon membrane 118 can have a thickness that can be greater or less than 50 nm. It is to be appreciated and understood that, while some embodiments described herein comprise a strained silicon membrane, in other embodiments, the optical resonator can comprise an unstrained silicon membrane instead of a strained silicon membrane, if and as desired.

To facilitate forming the quantum transducer 108, the device formation component can perform various processes (e.g., as part of the device formation process), including fabrication processes, material deposition processes, material removal processes (e.g., etching or other removal processes), epitaxial processes, material straining processes, patterning processes, component formation processes, and/or other desired processes, such as described herein, to process the chip stack and form the various components of the device 100 thereon.

The device 100 can comprise a substrate 122 that can be comprised of silicon or a silicon-based material. The device 100 also can comprise a silicon oxide ($SiO_2$) layer 124 (or other desired silicon-based material) that can be deposited or formed on top of the substrate 122. The $SiO_2$ layer 124 can have desired dimensions. For instance, the $SiO_2$ layer 124 can have a thickness of 100 nm, although, in other embodiments, the $SiO_2$ layer 124 can have a thickness that can be greater or less than 100 nm. As depicted in the device 100, during the device formation process, a desired portion of the $SiO_2$ layer 124 can be removed to create a gap (e.g., air gap) 126 between the strained silicon membrane 118 and the substrate 122, with the gap 126 also being between the top plate 120 of the capacitor 112 (e.g., top plate 120 on a portion of the strained silicon membrane 118) and the bottom plate 128 of the capacitor 112, as more fully described herein.

The device formation component can form the SiGe optical waveguide 116 on the strained silicon membrane 118 by depositing an SiGe layer on the strained silicon layer and selectively removing (e.g., selectively etching) desired portions of the SiGe layer to have the SiGe optical waveguide 116 remain after the removal process. The SiGe optical waveguide 116 can comprise a ring portion 130 (e.g., circular ring) and leads 132 that can be associated with (e.g., connected to or integrated with) the ring portion 130. In certain embodiments, the strained silicon membrane 118 (e.g., strained and crystalline silicon material) can be a desirably (e.g., suitably, enhancedly, or optimally) high prestressed soft clamping membrane that can have a phononic crystal structure (e.g., at least a portion of the membrane can have a phononic crystal structure), and can be or can provide a desirable (e.g., suitable, enhanced, or optimal) cladding structure for the SiGe optical waveguide 116 (e.g., the SiGe core), which can desirably enhance (e.g., increase, improve, or optimize) the $Q_O$ of the optical resonator 110 to achieve a desirably high $Q_O$ that can enhance performance of the quantum transducer 108. In some embodiments, the device formation component (e.g., employing the disclosed device formation process), by coupling (e.g., via a photoelastic, strained, and/or radiation pressure coupling) the silicon cladding structure of the strained silicon membrane 118 to the SiGe optical waveguide 116 can desirably increase $Q_O$ such that $Q_O$ can be sufficiently high enough to satisfy a defined optical quality factor criterion (e.g., sufficiently high enough to meet or exceed, and/or to be greater than or equal to, a defined threshold (e.g., minimum threshold) $Q_O$ value, in accordance with the defined optical quality factor criterion).

With regard to the high prestressed soft clamping membrane, the membrane 118 can be prestressed, for example, by having a desired amount of tensile stress applied to the membrane when it is fabricated such that the membrane can have a desirably high mechanical frequency and high $Q_m$. With regard to soft clamping, portions (e.g., edges) of a membrane typically can be clamped to another layer (e.g., $SiO_2$ layer or substrate) of a device. With typical clamping of the membrane, there usually can be an undesirably high mechanical loss induced at or near such clamped portions (e.g., edges) of the membrane. This mechanical loss can be due in part to the amplitude of the motion (e.g., out of plane motion) of the membrane near the boundary where the membrane is clamped to another layer. The soft clamping technique can be applied to the membrane to create a soft clamping membrane that can mitigate (e.g., reduce or minimize) mechanical loss associated with such clamped portions of the membrane. For instance, as part of the soft clamping technique, the device formation component can pattern the membrane 118 such that at least a portion of the membrane 118 can have a phononic crystal structure, such as described herein. This phononic crystal structure of the membrane 118 can desirably reduce or dampen the amplitude of the motion (e.g., out of plane motion) of the membrane 118 at or near the boundary or boundaries where the membrane 118 is clamped to another layer (while still allowing desirable movement of the membrane 118 in other portions of the membrane 118). This reduction or dampening of the amplitude of the motion of the membrane 118 at or near the boundary or boundaries where the membrane 118 is clamped to another layer can desirably mitigate (e.g., reduce, minimize, or "soften") the effect of clamping that would otherwise be associated with the membrane 118, including desirably mitigating (e.g., reducing or minimizing) the mechanical loss that would otherwise have been induced at or near such clamped portions (e.g., edges) of the membrane 118, and can enhance (e.g., increase, improve, or optimize) the $Q_m$ of the membrane 118 to achieve or facilitate achieving a desirably high $Q_m$.

In certain embodiments, the device formation component (e.g., employing the device formation process) can grow (e.g., epitaxial growth) the strained silicon membrane 118 using, for example, a desired epitaxial process, to have the strained silicon membrane surround and embed the SiGe optical waveguide 116 (e.g., the SiGe ring structure) (as depicted in FIG. 1), which can thereby provide a desirable cladding structure that can surround the SiGe optical waveguide 116, as more fully described herein. The thickness of the epitaxial-grown strained silicon membrane 118 can be greater than the initial thickness of the strained silicon membrane 118. Such a surrounding cladding structure of the strained silicon membrane 118 can desirably further enhance the $Q_O$ of the optical resonator to achieve an even higher $Q_O$ for the optical resonator (e.g., as compared to when the strained silicon membrane 118 is not epitaxially grown to surround and embed the SiGe optical waveguide 116), which can further enhance performance of the quantum transducer 108. In other embodiments, the device formation component can omit or bypass the growing of the strained silicon membrane 118 (if and as desired), and the SiGe optical waveguide 116 can reside on the surface of the strained silicon membrane 118 (e.g., the SiGe optical waveguide 116 can be a ridge-type optical waveguide having a ridge-type structure), instead of being embedded in the strained silicon membrane 118.

The defined optical quality factor criterion can indicate or specify a desired target or threshold $Q_O$ for the optical resonator that, in some embodiments, can be 1 million. In other embodiments, the target or threshold $Q_O$ for the optical resonator can be (e.g., can be selected to be) 10 million, although, in still other embodiments, the target or threshold $Q_O$ can be greater than or less than 1 million, as desired. In accordance with various embodiments, the optical resonator can achieve a $Q_O$ that can range from, for example, approximately 1 million to 1 billion.

The device formation component (e.g., employing the device formation process) also can deposit a desired metallization layer on top of the strained silicon membrane 118 and/or the SiGe optical waveguide 116, and can selectively remove and/or pattern the metallization layer to facilitate forming certain components of the device 100. In some embodiments, the metallization layer can comprise a superconducting material, such as Nb, a Nb-based superconducting material, Al, or Al-based superconducting material, or another desired superconducting material. For instance, the device formation component can deposit the superconducting material on the strained silicon membrane 118 and/or the SiGe optical waveguide 116, and can selectively remove desired portions of the superconducting material and/or pattern the superconducting material to form the top plate 120 of the capacitor 112 on the strained silicon membrane 118 in proximity to the ring portion 130 of the SiGe optical waveguide 116, form the microwave resonator 114, and form at least a portion (e.g., shunt capacitor or other component) of the qubit 106. The superconducting material can have desired dimensions. For instance, the superconducting material can have a thickness of 100 nm, although, in other embodiments, the superconducting material can have a thickness that can be greater or less than 100 nm. The top plate 120 of the capacitor 112 can be associated with (e.g., electronically connected to) one end of the microwave resonator 114, and the microwave resonator 114 can be associated with the qubit 106 at the other end of the microwave resonator 114. In some embodiments, the microwave resonator 114 can have a meandering structure, although, in other embodiments, the microwave resonator 114 can have a different desired structure. The microwave resonator 114 can have a desired resonant frequency, such as, for example, 7.0 gigahertz (GHz), although, in other embodiments, the microwave resonator 114 can have a resonant frequency that can be higher or lower than 7.0 Ghz. In certain embodiments, the microwave resonator 114 can be or can comprise an inductor that can provide a desired amount of inductance, or, in other embodiments, a different type of resonator can be utilized. In some embodiments, the amount of inductance of the inductor can be 30 picohenries (pH) (e.g., when the target frequency is 5.0 GHz and the capacitance of the capacitor 112 is 3.0 picoFarads (pF)), although, in other embodiments, the amount of inductance can be greater than or less than 30 pH. The capacitor 112 can have a desired capacitance, which can be on the order of picoFarads. For instance, the capacitor 112 can have a capacitance of 3.0 pF, although, in other embodiments, the capacitance can be greater than or less than 3.0 pF. The inductance (L) and capacitance (C) can be based on the target frequency (e.g., target frequency=$1/(2\pi\sqrt{LC})$, which can be selected, as desired, to be 5.0 GHz, 7.0 GHz, or another desired frequency greater or less than 7.0 GHz.

In some embodiments, to facilitate desirably forming the bottom plate 128 of the capacitor 112, the device formation component (e.g., employing the device formation process) can remove a desired portion of the substrate 122 by removing or etching substrate material from the back side of the substrate 122 to form a recessed region 134 and a hole in a front (e.g., top) side of the substrate 122 (e.g., a hole region in which the bottom plate 128 of the capacitor 112 can be formed), wherein the recessed region 134 and the hole (e.g., the shape and dimensions of the recessed region 134 and the hole) can be defined by the surfaces of the remaining portions of the substrate 122. The hole region can be located under and in proximity to the top plate 120 of the capacitor 112 and the associated portion of the strained silicon membrane 118. In some embodiments, the substrate material can be removed along the Si[111] plane of the substrate 122 to form the recessed region 134, such as described herein. In other embodiments, the substrate material can be removed from the back side of the substrate 122 along a different silicon plane (e.g., Si[100] plane, Si[110] plane, or other desired type of silicon plane) of the substrate 122 to form the recessed region in the back side of the substrate 122, extending to form the hole in the top side of the substrate 122. The device formation component can apply (e.g., deposit) the desired superconducting material to the surfaces of the substrate 122 that can define the recessed region 134 and to the hole in the top side of the substrate 122 to form an electrode 136, which can comprise the bottom plate 128. In certain embodiments, the electrode can be connected (e.g., electronically connected) to another component(s) (not shown) of or associated with the device 100.

In certain embodiments, a desired supporting material 138 (e.g., silicon or silicon-based material) can be deposited on the superconducting material that makes up the bottom electrode 136, including the bottom plate 128 of the capacitor 112, in the recessed region 134 on the back side of the substrate 122. This supporting material 138 can facilitate desirably reinforcing the bottom plate 128 of the capacitor 112 to prevent or inhibit (e.g., reduce or minimize) movement of the bottom plate 128 and maintain the integrity of the bottom plate 128 of the capacitor 112.

In some embodiments, the device formation component can pattern the strained silicon membrane 118 to form a phononic crystal structure, such as referenced above and described herein. For instance, the device formation component can form holes, such as holes 140, 142, and 144, in a desired periodic or repeated pattern to form the phononic crystal structure in a desired portion of the strained silicon membrane 118, as well as other holes, such as holes 146, 148, and 150, that can be located near defect regions in the strained silicon membrane 118. In some embodiments, the holes 146, 148, and 150 also can be part of the periodic or repeated pattern, although being in proximity to the defect regions. Patterning the strained silicon membrane 118 to form the phononic crystal structure can desirably enhance (e.g., increase, improve, or optimize) the $Q_m$ of the strained silicon membrane 118 (e.g., the phononic crystal structure can have a desirably high $Q_m$), which can enhance the performance of the quantum transducer 108. Associating (e.g., coupling via a photoelastic, strained, and/or radiation pressure coupling) the strained silicon membrane, comprising the phononic crystal membrane structure, with the SiGe optical waveguide 116 can result in a desirably high $Q_m$ such that the $Q_m$ can be sufficiently high enough to satisfy a defined mechanical quality factor criterion (e.g., sufficiently high enough to meet or exceed, and/or to be greater than or equal to, a defined threshold (e.g., minimum threshold) $Q_m$ value, in accordance with the defined mechanical quality factor criterion). It is to be appreciated and understood that, while the side cross-sectional view 104 of the device 100 appears to show gaps between portions of the strained silicon membrane 118, that is merely due to the cross-section being in the middle of the holes (e.g., holes 146, 148, and 150) formed in the strained silicon membrane 118, and, as shown in the top view 102 of the device 100, it can be observed that the strained silicon membrane 118 can span across the chip stack. It also is to be appreciated and understood that, in other embodiments, if and as desired, the device formation component can omit or bypass patterning the strained silicon membrane 118 to form a phononic crystal structure. The defined mechanical quality factor criterion can indicate or specify a desired target or threshold $Q_m$ for the strained silicon membrane 118 and associated optical resonator that, in some embodiments, can be (e.g., can be selected to be) 0.1 million. In other embodiments, the target or threshold $Q_m$ can be 1 million, although, in still other embodiments, the target or threshold $Q_m$ can be greater than or less than 0.1 million, as desired. In accordance with various embodiments, the strained silicon membrane 118 and associated optical resonator can achieve a $Q_m$ that can range from, for example, approximately 0.1 million to 1 billion.

In this example embodiment of the device 100, there can be two separate defects (e.g., defect regions) and two drums (e.g., a first drum in the region where the top plate 120 of the capacitor 112 is located and a second drum in the region where the ring portion 130 of the SiGe optical waveguide 116 is located). The two defects can be two portions of the strained silicon membrane 118 that do not have the phononic crystal structure and/or can be defects (e.g., irregularities) in the phononic crystal structure. For instance, as can be observed in the top view 102 of the device 100, the strained silicon membrane 118 can have a repeating, periodic pattern of holes (e.g., holes 140, 142, and 144, as well as other holes that can be formed in such periodic pattern), and there can be two defect regions in the area of or near (e.g., surrounding and/or underneath) the top plate 120 of the capacitor 112 and the ring portion 130 of the SiGe optical waveguide 116 that do not have the same periodic pattern of holes as the phononic crystal structure. The patterning of the desired portion of the strained silicon membrane 118 can act or facilitate acting as a reflector for mechanical waves, and also can be referred to as an acoustic reflector. The areas where the defect regions (e.g., regions that do not have the periodic pattern of the phononic crystal structure) are located can be the areas where the reflected energy (e.g., energy from the reflected waves) can be focused. During operation, the defect regions of the strained silicon membrane 118 typically can have a relatively higher degree of motion than the phononic crystal portion of the strained silicon membrane 118.

With regard to the operation of the SiGe/Si electro-optomechanical quantum transducer 108, the microwave resonator 114 and capacitor 112 can be an inductor-capacitor (LC) oscillator that can form a resonant subsystem. The microwave resonator 114 can sense or detect photons (e.g., microwave photons) at relatively lower microwave frequencies and those photons can be coupled into the resonant subsystem where it can create a resonant mode in the LC oscillator, and this can lead to or result in an oscillating field across the top plate 120 and bottom plate 128 of the capacitor. This oscillating field can produce a corresponding amount of force that can drive the mechanical resonator (e.g., cause motion in the mechanical resonator) formed by the capacitor 112 and the strained silicon membrane 118, with the top plate 120 of the capacitor 112 being associated with (e.g., connected to) the strained silicon membrane such that, as the top plate 120 moves in response to the force of the oscillating field, the strained silicon membrane 118 can correspondingly move. Thus, the mechanical resonator can be driven by microwave photons resonating within the LC oscillator. This can represent the electromechanical portion of the electro-optomechanical quantum transduction process performed by the SiGe/Si electro-optomechanical quantum transducer 108.

As disclosed, the mechanical resonator can be driven by microwave photons resonating within the LC oscillator, and the strained silicon membrane 118 can correspondingly move. The mechanical motion of the mechanical resonator can be desirably coupled to the optical resonator 110 because both the optical resonator 110 and the top plate 120 of the capacitor 112 can share the motion of the mechanical mode via the strained silicon membrane 118. When the top plate 120 of the capacitor 112 is being driven and moved by the resonance in the LC oscillator, this can actually cause not only the strained silicon membrane 118 to move but also can produce (e.g., generate) corresponding oscillating strain forces in the strained silicon membrane 118 such that, as the strained silicon membrane 118 goes through its motion, the strain within the strained silicon membrane 118 can be correspondingly changing and the strain within the SiGe optical waveguide 116 can be correspondingly changing. The changes in the strain within the SiGe optical waveguide 116 can cause the refractive index of the optical resonator 110 to change because the refractive index of the optical resonator 110 can be strain dependent (e.g., can be based on the strain level or changes in strain level of the SiGe optical waveguide 116). That is, the refractive index of the optical resonator 110 can change (e.g., can be modified) as a function of the change of strain in the SiGe optical waveguide 116.

There already can be optical photons at a certain frequency that can be circulating within the optical resonator 110 (e.g., circulating within the SiGe optical waveguide 116 of the optical resonator 110). Such optical photons also can be referred to as pump photons. In response to, and based on, the change (e.g., shift) in the refractive index of the optical resonator 110, the frequency of the pump photons can be modified, or up-converted or down-converted, to a higher or lower frequency to produce optical photons having a relatively higher frequency or relatively lower frequency, respectively. The optical resonator 110 can have a number (e.g., many) of different resonant modes at different frequencies. The pump photons can be pumping or associated with one of those resonant modes. As a result of the change in the refractive index the change of the optical resonator 110, the frequency of the pump photons can be up-converted or down-converted to produce optical photons having a relatively higher frequency or relatively lower frequency, respectively, that can be associated with a different resonant mode of the optical resonator 110. The frequency of the up-converted or down-converted photons can be higher than the frequency of the microwave photons sensed by the microwave resonator 114.

It can be desirable and/or useful to identify or evaluate the up-converted or down-converted optical photons and/or the difference in the frequency of the up-converted or down-converted optical photons relative to the frequency of the pump photons. The output of the optical resonator 110 can comprise the pump optical photons and the up-converted or down-converted optical photons. In some embodiments, an optical filter (not shown in FIG. 1; and as more fully described herein) can be used on or applied to the optical photons output by the optical resonator 110 (e.g., the SiGe optical waveguide 116 of the optical resonator 110) to filter out the pump photons and produce or output the up-converted or down-converted optical photons at the relative higher or lower frequency (e.g., up-converted frequency or down-converted frequency). Accordingly, the SiGe/Si electro-optomechanical quantum transducer 108 can sense (e.g., detect) or read microwave photons from the qubit 106 and through the electro-optomechanical quantum transduction process performed by the SiGe/Si electro-optomechanical quantum transducer 108 can desirably produce up-converted or down-converted optical photons at a relatively higher frequency (than the frequency of the microwave photons) as an output. The coupling of the mechanical resonator to the optical resonator 110, the changing of the strain of the strained silicon membrane 118 and/or the SiGe optical waveguide 116 based on the motion of the top plate 120 of the capacitor 112 and corresponding motion of the strained silicon membrane 118, the change in the refractive index of the optical resonator 110 based on the change of the strain, and the resulting up-converting or down-converting of pump photons to produce optical photons having a relatively higher frequency or relatively lower frequency, respectively, can be part of the optomechanical part of the electro-optomechanical quantum transduction process.

In some embodiments, when the SiGe/Si electro-optomechanical quantum transducer 108 is being used to sense or read the state of the qubit 106 (e.g., sense the charge of the qubit 106, where the qubit charge can indicate or correspond to the state of the qubit 106), the state of the qubit 106 can correspond to the frequency (e.g., the relatively higher frequency) of the up-converted optical photons produced as an output from the transducer 108. For instance, the change or difference in frequency between the relatively higher (or lower) frequency of the up-converted (or down-converted) optical photons and the frequency of the pump photons can correspond to or indicate the state or charge of the qubit 106. The up-converted or down-converted optical photons can desirably exist in a coherent or quantum state in a room temperature environment, in contrast to the microwave photons (e.g., sensed from the qubit 106), which, while able to exist in a coherent or quantum state in the very low temperature environment of a cryostat in which the quantum computer can be located, can rapidly and undesirably decohere when exposed to a room temperature environment (e.g., because the microwave photons can rely on the superconductivity of the quantum computer, which has to be in the very low temperature environment of the cryostat).

It is to be appreciated and understood that, while, in some embodiments, the SiGe/Si electro-optomechanical quantum transducer 108 is described herein as being associated with the qubit 106 and used to sense the state or charge of the qubit 106, the disclosed subject matter is not so limited, and, in other embodiments, the SiGe/Si electro-optomechanical quantum transducer 108 can desirably be used for a number of other types of applications, such as, for example, other types of state or charge sensing applications, other types of applications that can involve sensing microwave photons and transducing or converting microwave photons to generate corresponding optical photons, optical switches or phase shifters (e.g., high speed and/or low power optical switches or phase shifters), tunable optical or mechanical filters, and/or electrical signal measurement in the presence of strong electromagnetic interference.

As disclosed herein, the SiGe/Si electro-optomechanical quantum transducer 108 (and other similar SiGe/Si electro-optomechanical quantum transducers, such as described herein) can have a number of advantages over existing technology. For instance, the SiGe/Si electro-optomechanical quantum transducer can have a desirably (e.g., significantly) higher $Q_O$ and desirably higher $Q_m$ than existing transducers with a desirable microwave property. The SiGe/Si electro-optomechanical quantum transducer also can have desirably low mechanical dissipation at low temperature. The SiGe/Si electro-optomechanical quantum transducer also can be desirably compact, as such quantum transducer, associated qubit, and associated circuitry can be formed on a single IC chip, and can be compatible with superconducting quantum computers.

It is to be appreciated and understood that, while the device 100 only depicts one qubit and one quantum transducer formed on a single die, in some embodiments, the device 100 can comprise a desired number of qubits and a desired number of quantum transducers respectively associated with the qubits that can be formed on the chip stack on a single die.

Figure 2:
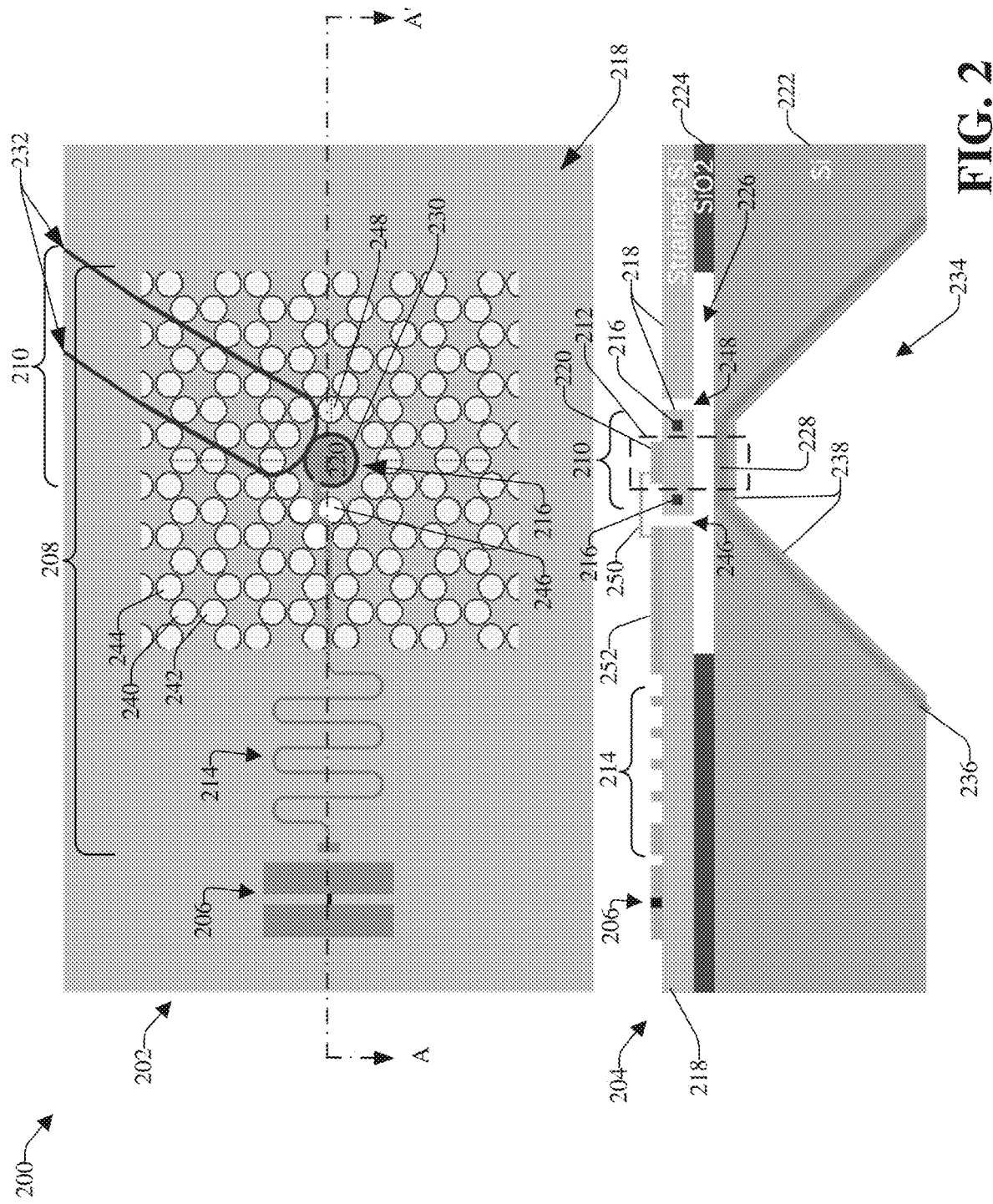
FIG. 2 depicts a diagram of a top view and a side view of an example, non-limiting device that can comprise a quantum transducer associated with a qubit, with the quantum transducer comprising a single defect region and an air bridge associated with a top electrode of a capacitor that can connect the capacitor to a microwave resonator, in accordance with various aspects and embodiments of the disclosed subject matter.

Referring to FIG. 2, FIG. 2 depicts a diagram of a top view and a side view (e.g., side cross-sectional view) of an example, non-limiting device 200 that can comprise a quantum transducer (e.g., an SiGe/Si electro-optomechanical quantum transducer) associated with a qubit, with the quantum transducer comprising a single defect region and an air bridge associated with a top electrode of a capacitor that can connect the capacitor to a microwave resonator, in accordance with various aspects and embodiments of the disclosed subject matter. FIG. 2 presents a top view 202 of the device 200, and a side cross-sectional view 204 (A-A') of the device 200.

The device 200 can comprise a qubit 206 and SiGe/Si electro-optomechanical quantum transducer 208. The SiGe/Si electro-optomechanical quantum transducer 208 can comprise an SiGe/Si optical ring resonator 210, a capacitor 212, a microwave resonator 214, and other components and circuitry, that can be associated with (e.g., electronically and communicatively connected to) the qubit 106 and formed on the same chip stack and die as the qubit 206 (and/or other qubits and associated SiGe/Si electro-optomechanical quantum transducers on the same chip stack and die). The optical ring resonator 210 can comprise an SiGe optical waveguide 216 and a strained silicon membrane 218 that can be associated with (e.g., connected to) the SiGe optical waveguide 216 and a top plate 220 of the capacitor 212. The strained silicon membrane 218 can have a desirable (e.g., suitable, enhanced, or optimal) photoelastic or strained with the SiGe optical waveguide 216.

The device 200 can comprise a substrate 222 that can be comprised of silicon or a desired silicon-based material. The device 200 also can comprise an $SiO_2$ layer 224 (or other desired silicon-based material) that can be deposited or formed on top of the substrate 222. As depicted in the device 200, during the device formation process, a desired portion of the $SiO_2$ layer 224 can be removed to create a gap (e.g., an air gap) 226 between the strained silicon membrane 218 and the substrate 222, with the gap 226 also being between the top plate 220 of the capacitor 212 (e.g., top plate 220 on a portion of the strained silicon membrane 218) and the bottom plate 228 of the capacitor 212, as more fully described herein. The SiGe optical waveguide 216 can comprise a ring portion 230 (e.g., circular ring) and leads 232 that can be associated with (e.g., connected to or integrated with) the ring portion 230.

The strained silicon membrane 218 can be a desirably (e.g., suitably, enhancedly, or optimally) high prestressed soft clamping membrane and can be or can provide a desirable (e.g., suitable, enhanced, or optimal) cladding structure for the SiGe optical waveguide 216, which can desirably enhance (e.g., increase, improve, or optimize) the $Q_O$ of the optical resonator 210 to achieve a desirably high $Q_O$ that can enhance performance of the quantum transducer 208. In some embodiments, the device formation component can grow (e.g., via epitaxial growth) the strained silicon membrane 218 using, for example, a desired epitaxial process, to have the strained silicon membrane 218 surround and embed the SiGe optical waveguide 216 (as depicted in FIG. 2), which can thereby provide a desirable cladding structure that can surround the SiGe optical waveguide 216, as more fully described herein. Such a surrounding cladding structure of the strained silicon membrane 218 can desirably further enhance the $Q_O$ of the optical resonator to achieve an even higher $Q_O$ for the optical resonator (e.g., as compared to when the strained silicon membrane 218 is not epitaxially grown to surround and embed the SiGe optical waveguide 216), which can further enhance performance of the quantum transducer 208. In other embodiments, the device formation component can omit or bypass the growing of the strained silicon membrane 218 (if and as desired), and the SiGe optical waveguide 216 can reside on the surface of the strained silicon membrane 218, for example, as a ridge-type optical waveguide having a ridge-type structure, instead of being embedded in the strained silicon membrane 218.

In some embodiments, to facilitate desirably forming the bottom plate 228 of the capacitor 212, the device formation component (e.g., employing the device formation process) can remove a desired portion of the substrate 222 by removing (e.g., etching) substrate material from the back side of the substrate 222 to form a recessed region 234 and a hole in a top side of the substrate 222 (e.g., a hole region in which the bottom plate 228 can be formed). The hole region can be located under and in proximity to the top plate 220 of the capacitor 212 and the associated portion of the strained silicon membrane 218. In certain embodiments, the substrate material can be removed along the Si[111] plane of the substrate 222 to form the recessed region 234, such as described herein. The device formation component can apply (e.g., deposit) the desired superconducting material to the surfaces of the substrate 222 that can define the recessed region 234 and to the hole in the top side of the substrate 222 to form an electrode 236, which can comprise the bottom plate 228. In certain embodiments, the electrode can be connected to another component(s) (not shown) of or associated with the device 200.

In certain embodiments, a desired supporting material 238 (e.g., silicon or silicon-based material) can be deposited on the superconducting material that makes up the bottom electrode 236, including the bottom plate 228 of the capacitor 212, in the recessed region 234 on the back side of the substrate 222. This supporting material 238 can facilitate desirably reinforcing the bottom plate 228 of the capacitor 212 to prevent or inhibit (e.g., reduce or minimize) movement of the bottom plate 228 and maintain the integrity of the bottom plate 228 of the capacitor 212.

In some embodiments, the device formation component can pattern the strained silicon membrane 218 to form a phononic crystal structure. For instance, the device formation component can form holes, such as holes 240, 242, and 244, in a desired periodic or repeated pattern to form the phononic crystal structure in a desired portion of the strained silicon membrane 218, as well as other holes, such as holes 246 and 248, that can be located near a defect region in the strained silicon membrane 218. In some embodiments, the holes 246 and 248 also can be part of the periodic or repeated pattern, although being in proximity to the defect region. Patterning the strained silicon membrane 218 to form the phononic crystal structure can desirably enhance (e.g., increase, improve, or optimize) the $Q_m$ of the strained silicon membrane 218, which can enhance the performance of the quantum transducer 208. It is to be appreciated and understood that, while the side cross-sectional view 204 of the device 200 appears to show gaps between portions of the strained silicon membrane 218, that is merely due to the cross-section being in the middle of the holes (e.g., holes 246 and 248) formed in the strained silicon membrane 218, and, as shown in the top view 202 of the device 200, it can be observed that the strained silicon membrane 218 can span across the chip stack. It also is to be appreciated and understood that, in other embodiments, if and as desired, the device formation component can omit or bypass patterning the strained silicon membrane 218 to form a phononic crystal structure.

The SiGe/Si electro-optomechanical quantum transducer 208 of the device 200 can operate and function in a similar manner as the SiGe/Si electro-optomechanical quantum transducer 108 of the device 100 of FIG. 1 with regard to performing a desired electro-optomechanical quantum transduction process (e.g., sensing a state or charge of a qubit(s), and/or sensing microwave photons and transducing or converting microwave photons to generate corresponding optical photons), such as more fully described herein, except that the quantum transducer 208 can comprise one defect region (e.g., one drum and associated defect region), instead of two separate defect regions (and associated drums). The defect region can be a portion of the strained silicon membrane 218 that does not have the phononic crystal structure and/or can be a defect (e.g., irregularity) in the phononic crystal structure. For instance, as can be observed in the top view 202 of the device 200, the strained silicon membrane 218 can have a repeating, periodic pattern of holes (e.g., holes 240, 242, and 244, as well as other holes that can be formed in such periodic pattern), and there can be a defect region in the area of or near (e.g., surrounding and/or underneath) the top plate 220 of the capacitor 212 and the ring portion 230 of the SiGe optical waveguide 216 that do not have the same periodic pattern of holes as the phononic crystal structure.

As also can be observed, in the quantum transducer 208, the top plate 220 of the capacitor 212 can be within and surrounded by the ring portion 230 of the SiGe optical waveguide 216. To facilitate connecting the top plate 220 of the capacitor 212 to the microwave resonator 214, in some embodiments, the device formation component (e.g., employing the device formation process) can create or form a bridge component 250 (e.g., air bridge) that can extend upward and over the ring portion 230 of the SiGe optical waveguide 216 (e.g., with a gap between the bridge component 250 and the ring portion 230) and can extend downward to connect to a lead 252 that can be connected to the microwave resonator 214. The bridge component 250 and lead 252 can be formed of the desired superconducting material.

Figure 3:
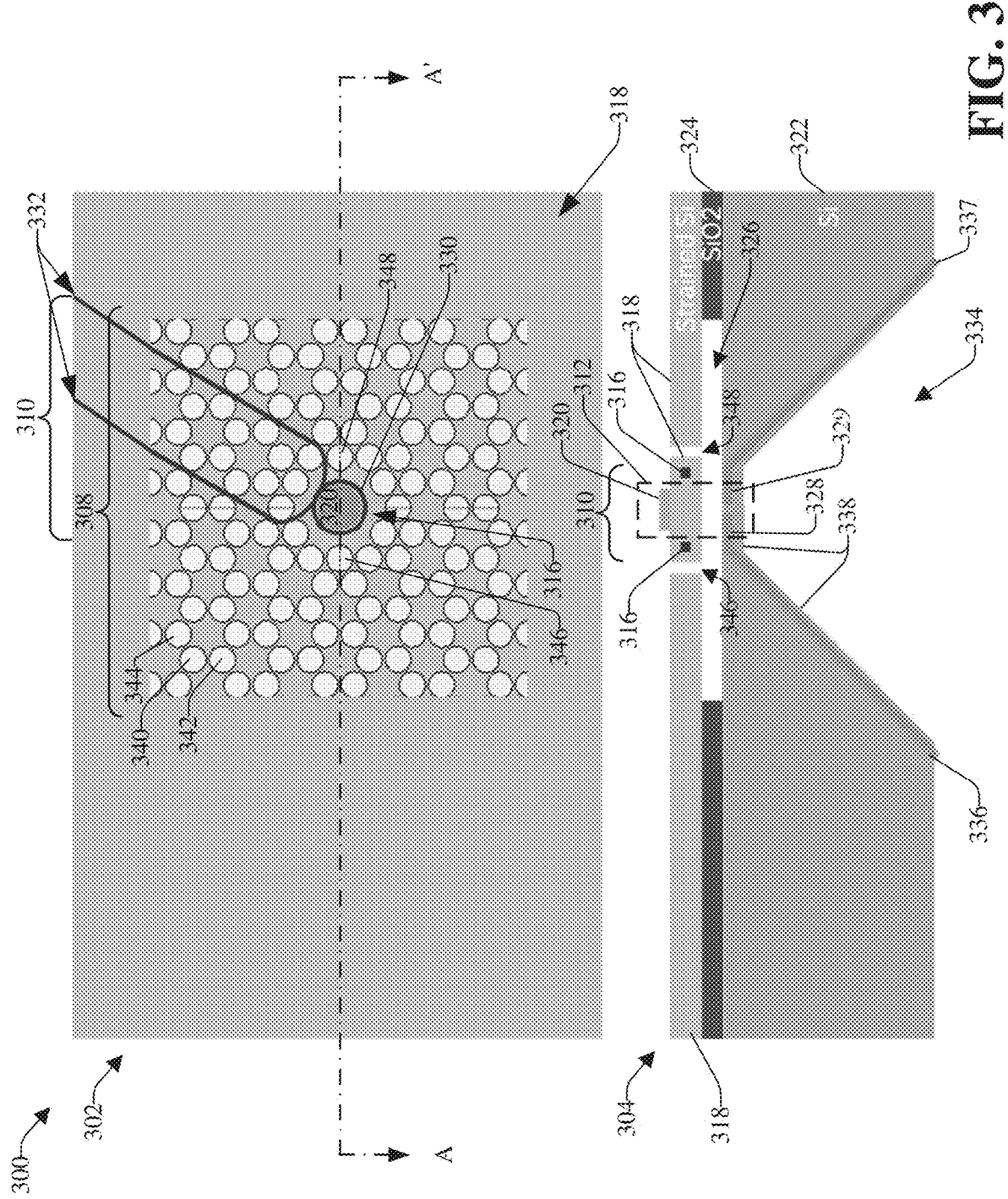
FIG. 3 illustrates a diagram of a top view and a side view of an example, non-limiting device that can comprise a quantum transducer associated with a qubit, with the quantum transducer comprising a single defect region and a capacitor component having two half or split bottom electrodes associated with a top electrode, in accordance with various aspects and embodiments of the disclosed subject matter.

Turning to FIG. 3, FIG. 3 illustrates a diagram of a top view and a side view (e.g., side cross-sectional view) of an example, non-limiting device 300 that can comprise a quantum transducer (e.g., an SiGe/Si electro-optomechanical quantum transducer) associated with a qubit, with the quantum transducer comprising a single defect region and a capacitor component having two half or split bottom electrodes associated with a top electrode, in accordance with various aspects and embodiments of the disclosed subject matter. FIG. 3 presents a top view 302 of the device 300, and a side cross-sectional view 304 (A-A') of the device 300.

In some embodiments, the device 300 can comprise a qubit (not shown in FIG. 3; as described herein) and SiGe/Si electro-optomechanical quantum transducer 308. In accordance with various embodiments, the SiGe/Si electro-optomechanical quantum transducer 308 can comprise an SiGe/Si optical ring resonator 310, a capacitor component 312, a microwave resonator (not explicitly shown in FIG. 3; as described herein), and other components and circuitry, that can be associated with (e.g., electronically and communicatively connected to) the qubit and formed on the same chip stack and die as the qubit (and/or other qubits and associated SiGe/Si electro-optomechanical quantum transducers on the same chip stack and die). The optical ring resonator 310 can comprise an SiGe optical waveguide 316 and a strained silicon membrane 318 that can be associated with (e.g., connected to) the SiGe optical waveguide 316 and a top plate 320 of the capacitor component 312. The strained silicon membrane 318 can have a desirable (e.g., suitable, enhanced, or optimal) photoelastic or strained with the SiGe optical waveguide 316.

The device 300 can comprise a substrate 322 that can be comprised of silicon or a desired silicon-based material. The device 300 also can comprise an $SiO_2$ layer 324 (or other desired silicon-based material) that can be deposited or formed on top of the substrate 322. As depicted in the device 300, during the device formation process, a desired portion of the $SiO_2$ layer 324 can be removed to create a gap (e.g., an air gap) 326 between the strained silicon membrane 318 and the substrate 322, with the gap 326 also being between the top plate 320 of the capacitor component 312 (e.g., top plate 320 on a portion of the strained silicon membrane 318) and the bottom plate 328 and bottom plate 329 of the capacitor component 312, as more fully described herein. The SiGe optical waveguide 316 can comprise a ring portion 330 (e.g., circular ring) and leads 332 that can be associated with (e.g., connected to or integrated with) the ring portion 330.

The strained silicon membrane 318 can be a desirably (e.g., suitably, enhancedly, or optimally) high prestressed soft clamping membrane and can be or can provide a desirable (e.g., suitable, enhanced, or optimal) cladding structure for the SiGe optical waveguide 316, which can desirably enhance (e.g., increase, improve, or optimize) the $Q_O$ of the optical resonator 310 to achieve a desirably high $Q_O$ that can enhance performance of the quantum transducer 308. In some embodiments, the device formation component can grow (e.g., via epitaxial growth) the strained silicon membrane 318 using, for example, a desired epitaxial process, to have the strained silicon membrane 318 surround and embed the SiGe optical waveguide 316 (as depicted in FIG. 3), which can thereby provide a desirable cladding structure that can surround the SiGe optical waveguide 316, as more fully described herein. Such a surrounding cladding structure of the strained silicon membrane 318 can desirably further enhance the $Q_O$ of the optical resonator to achieve an even higher $Q_O$ for the optical resonator (e.g., as compared to when the strained silicon membrane 318 is not epitaxially grown to surround and embed the SiGe optical waveguide 316), which can further enhance performance of the quantum transducer 308. In other embodiments, the device formation component can omit or bypass the growing of the strained silicon membrane 318 (if and as desired), and the SiGe optical waveguide 316 can reside on the surface of the strained silicon membrane 318, for example, as a ridge-type optical waveguide having a ridge-type structure, instead of being embedded in the strained silicon membrane 318.

In some embodiments, to facilitate desirably forming the bottom plate 328 and bottom plate 329 of the capacitor component 312, the device formation component (e.g., employing the device formation process) can remove a desired portion of the substrate 322 by removing (e.g., etching) substrate material from the back side of the substrate 322 to form a recessed region 334 and a hole in a top side of the substrate 322 (e.g., a hole region in which the bottom plate 328 and bottom plate 329 can be formed). The hole region can be located under and in proximity to the top plate 320 of the capacitor component 312 and the associated portion of the strained silicon membrane 318. In certain embodiments, the substrate material can be removed along the Si[111] plane of the substrate 322 to form the recessed region 334, such as described herein. The device formation component can apply (e.g., deposit) the desired superconducting material to the surfaces of the substrate 322 that can define the recessed region 334 and to a desired portion of the hole in the top side of the substrate 322 to form an electrode 336 and an electrode 337 (e.g., half or split electrodes), wherein the electrode 336 can comprise the bottom plate 328 and the electrode 337 can comprise the bottom plate 329. In certain embodiments, the electrode 336 and electrode 337 can be connected to another component(s) (not shown) of or associated with the device 300.

In certain embodiments, a desired supporting material 338 (e.g., silicon or silicon-based material) can be deposited on the superconducting material that makes up the bottom electrode 336 and bottom electrode 337, including the bottom plate 328 and bottom plate 329 of the capacitor component 312, in the recessed region 334 on the back side of the substrate 322. This supporting material 338 can facilitate desirably reinforcing the bottom plate 328 and bottom plate 329 of the capacitor component 312 to prevent or inhibit (e.g., reduce or minimize) movement of the bottom plate 328 and bottom plate 329, and maintain the integrity of the bottom plate 328 and bottom plate 329 of the capacitor component 312.

In some embodiments, the device formation component can pattern the strained silicon membrane 318 to form a phononic crystal structure. For instance, the device formation component can form holes, such as holes 340, 342, and 344, in a desired periodic or repeated pattern to form the phononic crystal structure in a desired portion of the strained silicon membrane 318, as well as other holes, such as holes 346 and 348, that can be located near a defect region in the strained silicon membrane 318. In certain embodiments, the holes 346 and 348 also can be part of the periodic or repeated pattern, although being in proximity to the defect region. Patterning the strained silicon membrane 318 to form the phononic crystal structure can desirably enhance (e.g., increase, improve, or optimize) the $Q_m$ of the strained silicon membrane 318, which can enhance the performance of the quantum transducer 308. It is to be appreciated and understood that, while the side cross-sectional view 304 of the device 300 appears to show gaps between portions of the strained silicon membrane 318, that is merely due to the cross-section being in the middle of the holes (e.g., holes 346 and 348) formed in the strained silicon membrane 318, and, as shown in the top view 302 of the device 300, it can be observed that the strained silicon membrane 318 can span across the chip stack. It also is to be appreciated and understood that, in other embodiments, if and as desired, the device formation component can omit or bypass patterning the strained silicon membrane 318 to form a phononic crystal structure.

The SiGe/Si electro-optomechanical quantum transducer 308 of the device 300 can operate and function in a similar manner as the SiGe/Si electro-optomechanical quantum transducer 108 of the device 100 of FIG. 1 with regard to performing a desired electro-optomechanical quantum transduction process (e.g., sensing a state or charge of a qubit(s), and/or sensing microwave photons and transducing or converting microwave photons to generate corresponding optical photons), such as more fully described herein, except that the quantum transducer 308 can comprise one defect region (e.g., one drum and associated defect region), instead of two separate defect regions (and associated drums) and can comprise split or half electrodes 336 and 337, instead of a single bottom electrode. As disclosed, the defect region can be a portion of the strained silicon membrane 318 that does not have the phononic crystal structure and/or can be a defect in the phononic crystal structure. For instance, as can be observed in the top view 302 of the device 300, the strained silicon membrane 318 can have a repeating, periodic pattern of holes (e.g., holes 340, 342, and 344, as well as other holes that can be formed in such periodic pattern), and there can be a defect region in the area of or near (e.g., surrounding and/or underneath) the top plate 320 of the capacitor component 312 and the ring portion 330 of the SiGe optical waveguide 316 that do not have the same periodic pattern of holes as the phononic crystal structure.

As also can be observed, in the quantum transducer 308, the top plate 320 of the capacitor component 312 can be within and surrounded by the ring portion 330 of the SiGe optical waveguide 316. As disclosed, the quantum transducer 308 can comprise half or split electrodes, electrode 336 and electrode 337, wherein the electrode 336 can comprise the bottom plate 328 and the electrode 337 can comprise the bottom plate 329. The bottom plate 328 and bottom plate 329 can essentially share the top plate 320 of the capacitor component 312, as both the bottom plate 328 and bottom plate 329 can be in proximity to and can interact with the top plate 320 of the capacitor component 312. This can thereby form two capacitors that can be in series with each other with the top plate 320 and bottom plate 328 forming the first capacitor of the capacitor component 312 and the top plate 320 and the bottom plate 329 forming the second capacitor of the capacitor component 312.

In comparing the performance of the SiGe/Si electro-optomechanical quantum transducer 108, SiGe/Si electro-optomechanical quantum transducer 208, and SiGe/Si electro-optomechanical quantum transducer 308 of FIGS. 1, 2, and 3, respectively, the quantum transducer 108 and quantum transducer 208 each can have desirably high coupling, which can be relatively higher than the coupling provided by the quantum transducer 308. The quantum transducer 208 and quantum transducer 308 each can have a desirably low effective mass (m_eff), whereas the effective mass associated with the quantum transducer 108 (e.g., the effective mass associated with a mechanical mode associated with the quantum transducer 108) can be higher than that of the quantum transducer 208 and quantum transducer 308 due in part to the quantum transducer 108 having the two drum structure, instead of a one drum structure. Another benefit of the quantum transducer 308 and the quantum transducer 108 can be that they do not have to use a bridge component (e.g., an air bridge) like the quantum transducer 208 does. A potential issue of the quantum transducer 208, as compared to the quantum transducer 108 and quantum transducer 308, can be that the quantum transducer 208 can be relatively more difficult to fabricate (e.g., due in part to the bridge component) as compared to the quantum transducer 108 and quantum transducer 308 and there is the potential for the mechanical quality of the quantum transducer to be undesirably impacted due to the motion of the drum head (e.g., motion of the top plate 220 of the capacitor 212) can be coupled to the motion of the bridge component. A potential issue of the quantum transducer 308, as compared to the quantum transducer 108 and quantum transducer 208, can be that the quantum transducer 308 can have a relatively lower capacitive coupling and relatively higher parasitic capacitance, as compared to the quantum transducer 108 and quantum transducer 208.

Figure 4:
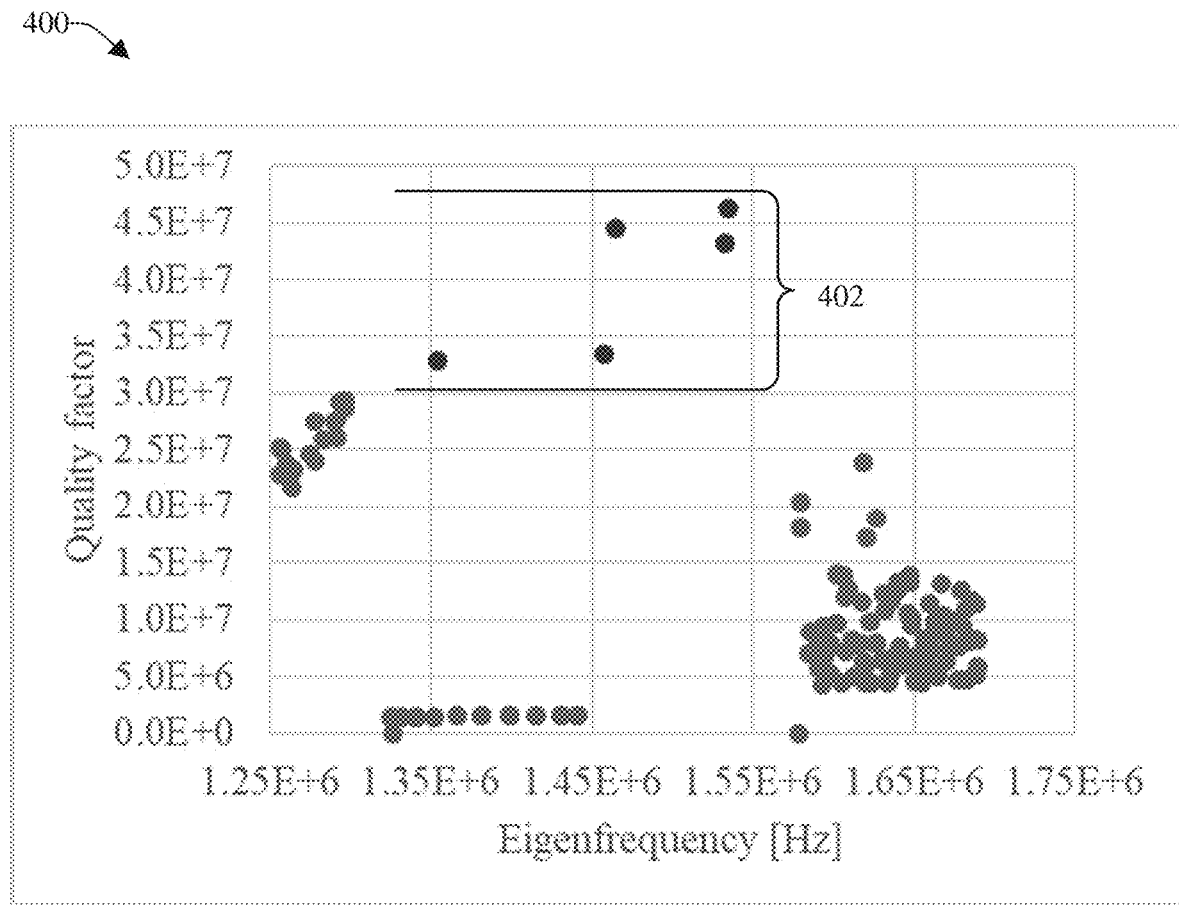
FIG. 4 depicts a diagram of a graph of a mechanical simulation of a defect mode of a quantum transducer comprising a single defect region, in accordance with various aspects and embodiments of the disclosed subject matter.

Referring to FIG. 4 (along with FIGS. 2 and 3), FIG. 4 depicts a diagram of a graph 400 of a mechanical simulation of a defect mode of a quantum transducer (e.g., an SiGe/Si electro-optomechanical quantum transducer) comprising a single defect region, in accordance with various aspects and embodiments of the disclosed subject matter. The example graph 400 plots various data points relating to the mechanical simulation based on mechanical quality factor ($Q_m$) (e.g., along the y-axis) as a function of eigenfrequency (e.g., along the x-axis), in Hertz (Hz). The example graph 400 of the mechanical simulation of the defect mode of the quantum transducer (e.g., quantum transducer having a single drum structure) can illustrate that there can be a number of modes, such as the modes in the area 402 of the graph 400, associated with the strained silicon membrane that can have a relatively and desirably (e.g., suitably, enhancedly, or exceptionally) high $Q_m$, where such modes can have relatively similar frequencies. Such modes in the area 402 of the graph 400 generally can fit inside the band gap of the phononic crystal of the membrane, and they can be the modes where the phononic crystal of the membrane can basically be reflecting energy into the defect region. The mechanical simulation of such quantum transducer can provide simulation results that can include an observed bandgap due to prestress of 1 gigapascal (GPa); an eigenfrequency of the defect mode $\omega_m$ equal to $2\pi \times 1.35$ megahertz (MHz); a mechanical quality factor ($Q_m$) of 32.8M (Q×frequency (f) product: $4.44 \times 10^{13}$ Hertz (Hz)); an effective mass of 2.31 nanograms (ng)→x_zero point field (zpf): 1.64 fm; and a strain tensor.

Figure 5:
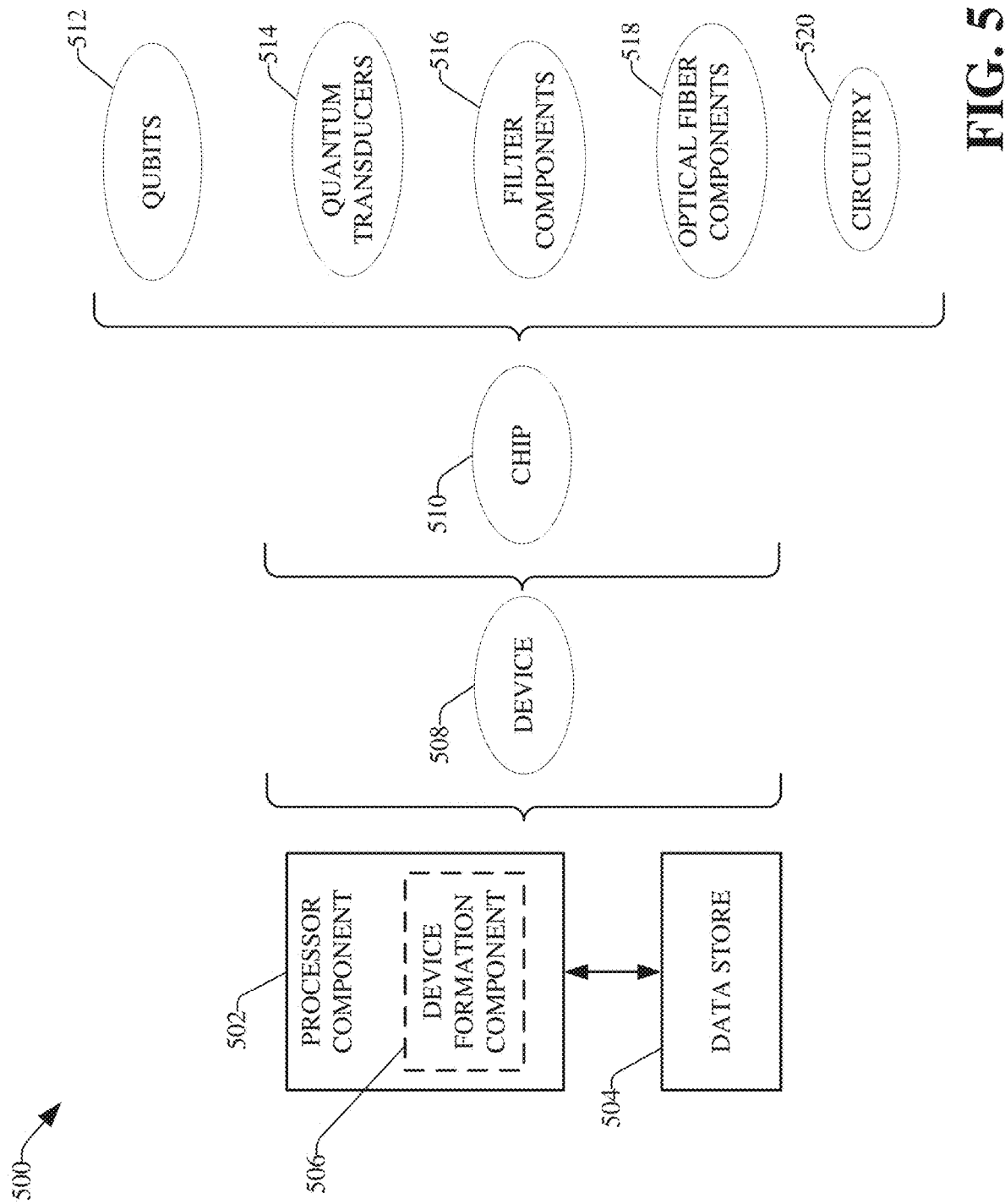
FIG. 5 depicts a block diagram of an example system that can be utilized to create, form, or design a device comprising qubits and associated quantum transducers, in accordance with various aspects and embodiments of the disclosed subject matter.

FIG. 5 depicts a block diagram of an example system 500 that can be utilized to create, form, or design a device comprising qubits and associated quantum transducers (e.g., SiGe/Si electro-optomechanical quantum transducers), in accordance with various aspects and embodiments of the disclosed subject matter. The system 500 can comprise a processor component 502 and a data store 504. In accordance with various embodiments, the processor component can comprise or be associated with (e.g., communicatively connected to) a device formation component 506 that can be utilized to create, form, or design various components of or associated with a device 508, including qubits and associated quantum transducers, such as more fully described herein. For instance, the device formation component 506 can be utilized to create, form, or design the various components of a device 508 that can be formed or situated on a chip 510 (e.g., a quantum computer or qubit device IC chip), or more than one chip, if desired. The various components can comprise, for example, qubits 512, quantum transducers 514 (e.g., SiGe/Si electro-optomechanical quantum transducers), filter components 516, optical fiber components 518, and/or associated circuitry 520.

As part of and to facilitate creating, forming, or designing the various components of or associated with a device 508, the device formation component 506 can form or process substrates. Also, as part of and to facilitate creating, forming, or designing the various components and/or circuitry of or associated with the device 508, the device formation component 506 also can form, deposit, remove (e.g., selectively remove or etch), pattern, or process materials, including silicon or silicon-based materials, SiGe materials, superconducting materials, or other materials of the device 508. For example, the device formation component 506 can employ and/or can control various processes, including fabrication processes, microfabrication processes, nanofabrication processes, material deposition processes (e.g., a low pressure chemical vapor deposition (LPCVD) process), masking or photoresist processes, photolithography processes, chemical etching processes (e.g., reactive-ion etching (RIE) process, a potassium hydroxide (KOH) etching process), other etching or removal processes, epitaxial processes, material straining processes, patterning processes, planarization processes (e.g., chemical-mechanical planarization (CMP) process), component formation processes, and/or other desired processes to desirably form, deposit, remove (e.g., selectively remove or etch), pattern, or process materials to facilitate creating or forming the respective components or circuitry of the device 508.

The processor component 502 can work in conjunction with the other components (e.g., the data store 504, the device formation component 506, or another component) to facilitate performing the various functions of the system 500. The processor component 502 can employ one or more processors, microprocessors, or controllers that can process data, such as information relating to designing, creating, or forming quantum computers, qubits, Josephson junctions, quantum transducers, optical resonators, optical waveguides, strained silicon membranes, microwave resonators, inductors, capacitors, electrodes, filters, optical fibers, and/or other components or devices, and information relating to circuit design criteria, circuit design algorithms, traffic flows, policies, protocols, interfaces, tools, and/or other information, to facilitate operation of the system 500, as more fully disclosed herein, and control data flow between the system 500 and other components (e.g., computer components, computer, laptop computer, other computing or communication device, or network device) associated with (e.g., connected to) the system 500.

The data store 504 can store data structures (e.g., user data, metadata), code structure(s) (e.g., modules, objects, hashes, classes, procedures) or instructions, information relating to designing, creating, or forming quantum computers, qubits, Josephson junctions, quantum transducers, optical resonators, optical waveguides, strained silicon membranes, microwave resonators, inductors, capacitors, electrodes, filters, optical fibers, and/or other components or devices, and information relating to circuit design criteria, circuit design algorithms, traffic flows, policies, protocols, interfaces, tools, and/or other information, to facilitate controlling operations associated with the system 500. In an aspect, the processor component 502 can be functionally coupled (e.g., through a memory bus) to the data store 504 in order to store and retrieve information desired to operate and/or confer functionality, at least in part, to the data store 504, the device formation component 506, or other component, and/or substantially any other operational aspects of the system 500.

It should be appreciated that the data store 504 described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 6:
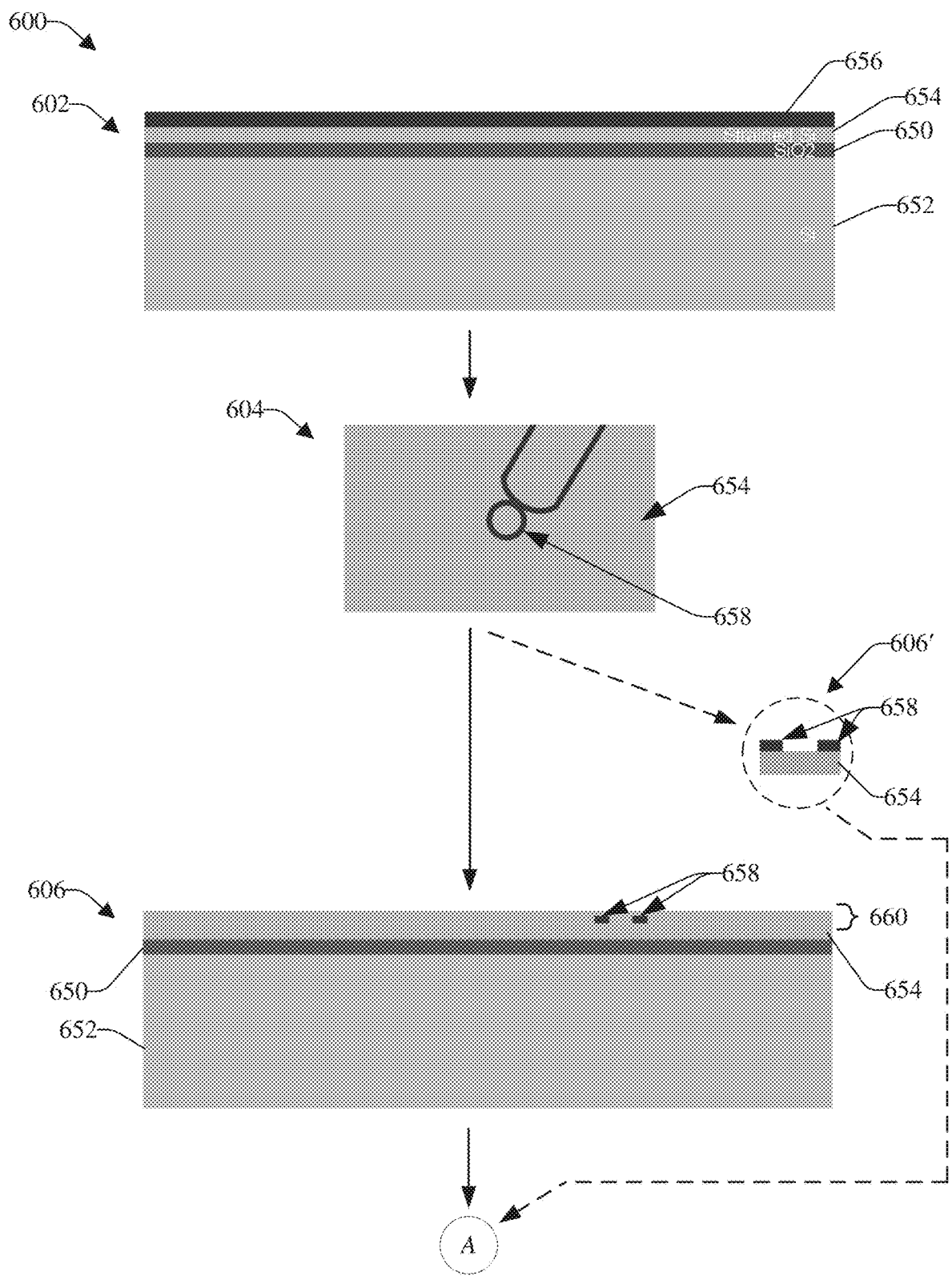
FIGS. 6, 7, and 8 depict diagrams of an example quantum transducer fabrication process that can be utilized to create, form, fabricate, or design a quantum transducer (e.g., an SiGe/Si electro-optomechanical quantum transducer), associated qubit, and associated components and circuitry, in accordance with various aspects and embodiments of the disclosed subject matter.
Figure 7:
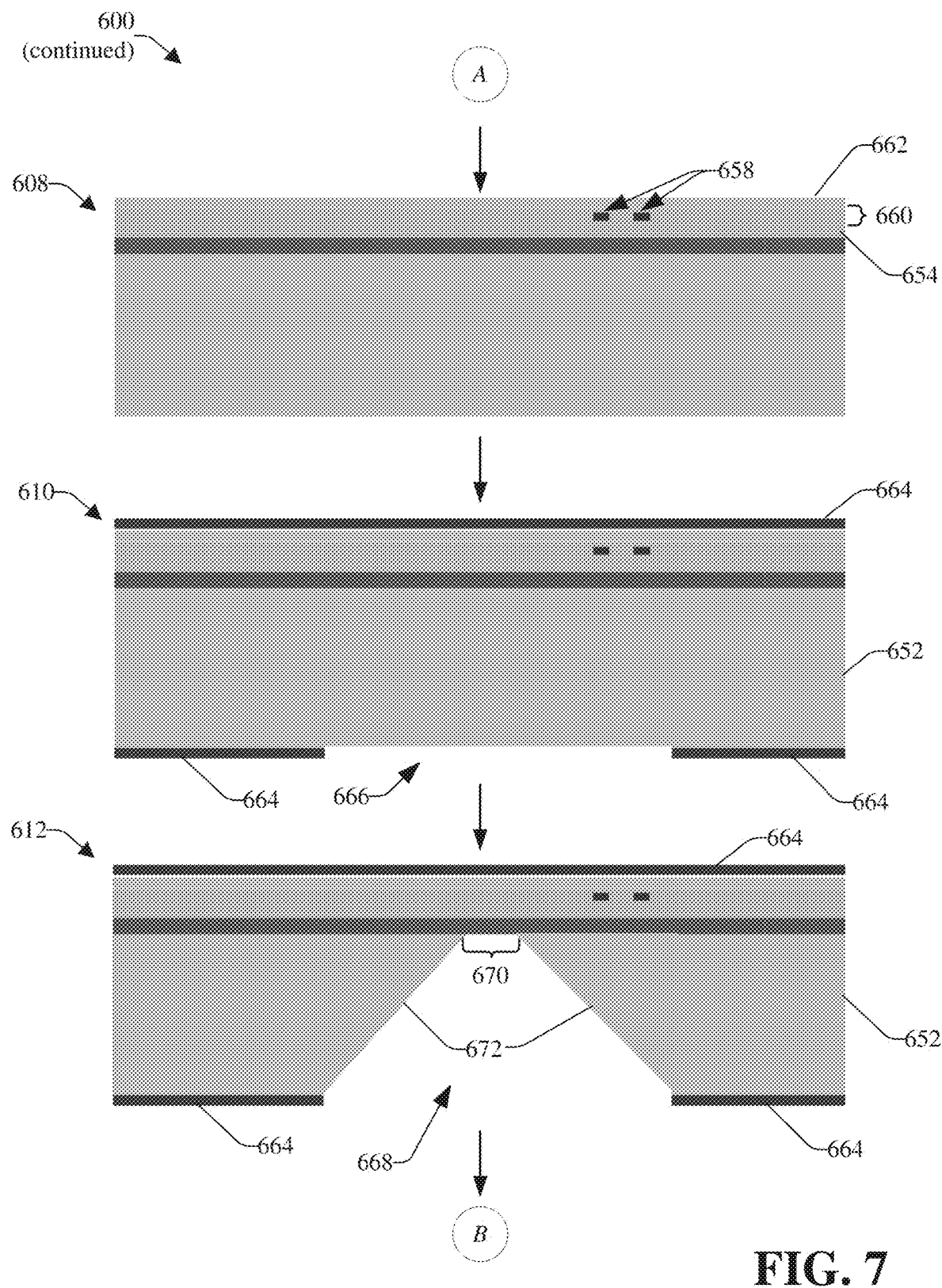
Figure 8:
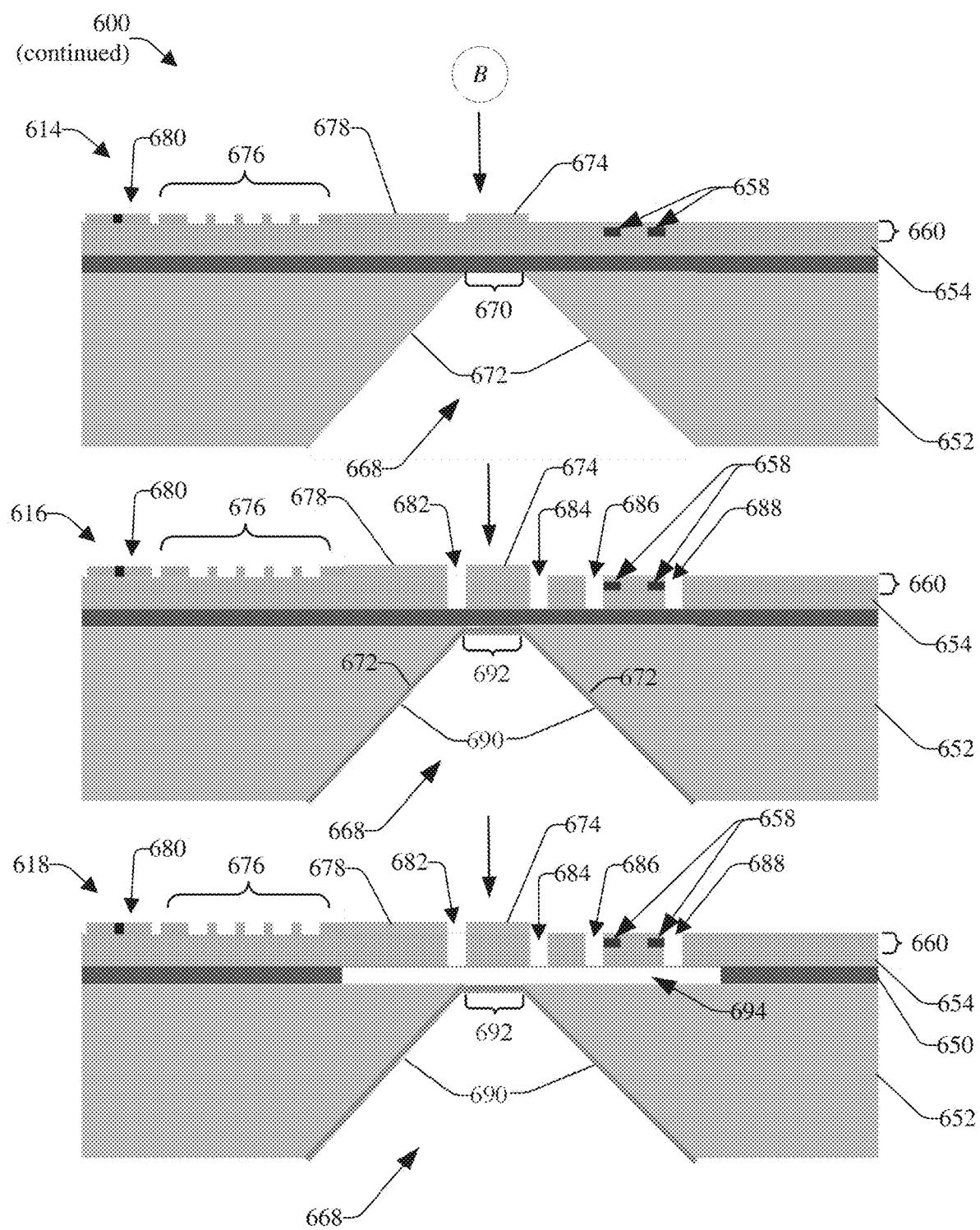

Referring to FIGS. 6-8 (along with FIG. 5), FIGS. 6-8 depict diagrams of an example quantum transducer fabrication process 600 that can be utilized to create, form, fabricate, or design a quantum transducer (e.g., an SiGe/Si electro-optomechanical quantum transducer), associated qubit, and associated components and circuitry, in accordance with various aspects and embodiments of the disclosed subject matter. The device formation component 506 can perform the example quantum transducer fabrication process 600 to create, form, fabricate, or design a quantum transducer, associated qubit, and associated components and circuitry (e.g., quantum circuitry).

As indicated at reference numeral 602 of the example quantum transducer fabrication process 600, the device formation component 506 can deposit a layer of an $SiO_2$ 650 material on a substrate 652 (e.g., silicon or silicon-based substrate), deposit a layer of a strained silicon material 654 on the SiO2 layer 650, and deposit a layer of SiGe material 656 on the strained silicon layer 654.

As indicated at reference numeral 604 of the example quantum transducer fabrication process 600, the device formation component 506 can form or etch an optical waveguide 658 of the optical resonator in the SiGe layer 656, wherein the optical resonator, including the SiGe material portion (e.g., SiGe optical waveguide 658) and the associated strained silicon portion underneath the SiGe material portion, can be part of the quantum transducer. For instance, the device formation component 506 can utilize a desired etching process, such as an RIE process or other desired etching process, to etch or form the optical waveguide 658 of the optical resonator (e.g., SiGe optical waveguide of the SiGe/Si optical resonator) in the SiGe layer 656 by selectively removing portions of the SiGe layer 656 to leave the optical waveguide 658 remaining on the strained silicon layer 654, as shown by the top view of the chip stack at reference numeral 604. In some embodiments, the optical waveguide 658 can be part of an optical ring resonator that can comprise a ring portion (e.g., a circular portion) and two extended portions, which can be electrical leads of the optical ring resonator.

In some embodiments, the device formation component 506 can grow or form an epi-strained silicon overcladding 660 on the strained silicon layer 654 and embed the optical waveguide 658 (e.g., SiGe optical waveguide) within the grown strained silicon layer, and can planarize the strained silicon layer, comprising the overcladding, using a desired planarization process (e.g., CMP or other desired planarization process), as indicated at reference numeral 606 of the example quantum transducer fabrication process 600. For instance, the device formation component 506 can utilize a desired epitaxial process to grow, deposit, or form the epi-strained silicon overcladding on the strained silicon layer, which can extend over and embed the optical waveguide 658 within the grown strained silicon layer. In other embodiments, the device formation component 506 can omit or bypass the epitaxial process (e.g., and as a result, the epi-strained silicon overcladding 660 of the strained silicon layer 654 will not be formed), and the optical waveguide 658 of the optical resonator can remain on the strained silicon layer (e.g., as a ridge-type optical waveguide) and not be embedded within the strained silicon (as indicated at reference numeral 606' of the example quantum transducer fabrication process 600). In such other embodiments, the optical waveguide 658 can have the cladding structure of the strained silicon layer 654 on one side (e.g., the under or bottom side) of the optical waveguide 658 and air cladding on the other side (e.g., air-exposed side or top side) of the optical waveguide 658. At this point, the example quantum transducer fabrication process 600 can proceed to reference point A, wherein the example quantum transducer fabrication process 600 can continue from reference point A, as shown in FIG. 7.

As indicated at reference numeral 608 of the example quantum transducer fabrication process 600, the device formation component 506 can deposit a layer of a desired superconducting material 662 on the strained silicon layer (e.g., 654 and/or 660) and/or the optical waveguide 658 of the optical resonator. The desired superconducting material can be, for example, Nb, Al, an Nb- or Al-based superconducting material, or another desired type of superconducting material. If the optical waveguide 658 is embedded, the device formation component 506 can deposit the desired superconducting material 662 on the strained silicon layer (e.g., the epi-grown strained silicon layer with overcladding). If the optical waveguide 658 of the optical resonator is not embedded, the device formation component 506 can deposit the desired superconducting material 662 on the strained silicon layer 654 and optical waveguide 658 of the optical resonator (e.g., the remaining portion of the SiGe material that forms the SiGe optical waveguide 658).

As indicated at reference numeral 610 of the example quantum transducer fabrication process 600, the device formation component 506 can deposit a desired hard masking material 664, which can act as a hard mask, on the superconducting material 662 on the top side of the chip stack and on the back side (e.g., bottom side) of the substrate 652 of the chip stack, and can selectively remove a portion of the desired hard masking material 664 from the back side of the substrate 652, for example, by patterning a back side rectangle 666 in the desired hard masking material 664 and removing the patterned rectangle portion of the desired hard masking material 664 from the back side of the chip stack. In some embodiments, the desired hard masking material 664 can be silicon nitride or another desired material that can act as a hard mask to facilitate protecting the superconducting material 662 on the top side of the chip stack and the selectively covered portions (e.g., portions selectively covered by the hard masking maternal) on the back side of the substrate 652 from being etched by the etching process that can be performed on the portion of the back side of the substrate 652 that can be exposed by the selective removal of the desired hard masking material 664 from the portion of the back side of the substrate 652. The device formation component 506 can employ a desired deposition process, such as, for example, an LPCVD process, to deposit the desired hard masking material 664 to the top side and back side of the chip stack, and a desired etching or material removal process to selectively remove the selected portion (e.g., the patterned rectangular portion) of the desired hard masking material 664 from the back side of the substrate 652.

As indicated at reference numeral 612 of the example quantum transducer fabrication process 600, the device formation component 506 can remove a desired portion of the substrate 652 located in the portion (e.g., a central or middle region portion) of the back side of the substrate 652 that was selectively exposed and not covered by the hard masking material to form a desired recessed region 668 in or through the back side of substrate 652 to form a hole 670 of a desired size and shape in the front or top side of the substrate 652, wherein the recessed region 668 can become progressively larger as the recessed region progresses to the back side of the substrate 652. The device formation component 506 can utilize a desired etching material and process, such as, for example, a KOH etching process or another desired etching material and process (e.g., another desired anisotropic silicon etching process), to remove the desired portion of the substrate 652 (e.g., in the central or middle region of the substrate). In some embodiments, the etching or removal process can remove the substrate material (e.g., silicon substrate material) along the Si[111] plane 672 of the substrate 652 to form the desired recessed region 668. The hole 670 at the front or top side of the substrate 652 can be desirably large enough and can be desirably positioned in relation to the top plate of the capacitor of the quantum transducer to be positioned under and in proximity to the top plate of the capacitor of the quantum transducer (wherein the top plate of the capacitor can be formed in the superconducting material 662 on the top side of the chip stack, as described herein), and the associated portion of the strained silicon membrane associated therewith, to facilitate forming a bottom plate of the capacitor in such hole region 670 associated with the substrate 652. At this point, the example quantum transducer fabrication process 600 can proceed to reference point B, wherein the example quantum transducer fabrication process 600 can continue from reference point C, as shown in FIG. 8.

As indicated at reference numeral 614 of the example quantum transducer fabrication process 600, the device formation component 506 can remove the remaining portions of the hard masking material 664 using a desired etching or removal process, and can form a desired pattern in the superconducting material 662 associated with (e.g., formed on) the strained silicon membrane (e.g., 654 and/or 660). The device formation component 506 can employ a desired etching or material removal process, such as, for example, a wet etch process or other desired etching or material removal process, to remove the remaining portions of the hard masking material 664 from the top side and bottom side of the chip stack. The device formation component 506, using a desired etching, patterning, or material removal process, also can pattern the superconducting material 662 on the strained silicon membrane (e.g., 654 and/or 660) to form the top plate 674 of the capacitor, the microwave resonator 676 associated with the capacitor, the electrical lead 678 that connects the top plate 674 to the microwave resonator 676, the qubit 680 associated with the microwave resonator 676, including the various components of the qubit, and the other components and circuitry associated therewith.

As indicated at reference numeral 616 of the example quantum transducer fabrication process 600, the device formation component 506 can pattern the strained silicon membrane (e.g., 654 and/or 660) to form a desired pattern of holes (e.g., 682, 684, 686, and/or 688) of desired shape and size in the strained silicon membrane (e.g., 654 and/or 660) that can span down to the $SiO_2$ layer 650 and can be in between the remaining portions of the superconducting material 662, including the top plate 674 of the capacitor and associated lead (e.g., the electrical lead connecting the top plate 674 of the capacitor to the microwave resonator 676), and the optical waveguide 658 of the optical resonator, and can apply the desired superconducting material 690 on the portions of the substrate (e.g., the portions of the substrate 652 along the Si[111] plane 672) that define the recessed region 668 formed on the back side of the substrate 652, including in the hole region 670 that was formed at the top side of the substrate 652 by removing the portion of the substrate 652 via the back side of the substrate 652. In some embodiments, the patterning of holes in the strained silicon membrane can desirably create a phononic crystal structure in the strained silicon membrane. The portion of the superconducting material 690 deposited in the hole region 670 can form the bottom plate 692 of the capacitor of the quantum transducer.

As indicated at reference numeral 618 of the example quantum transducer fabrication process 600, the device formation component 506 can perform a desired etching or removal process to remove a desired portion of the $SiO_2$ layer 650 underneath the top plate 674 of the capacitor, the electrical lead 678 connecting the top plate 674 of the capacitor to the microwave resonator 676, the optical waveguide 658, and the associated portion of the strained silicon layer 654 (e.g., the patterned portion of the strained silicon membrane) to form a gap 694 between the substrate 652 and the strained silicon layer 654, and release the strained silicon membrane (e.g., to enable the strained silicon membrane, and associated top plate 674 of the capacitor and the optical waveguide 658 of the optical resonator, to move in relation to the bottom plate 692 of the capacitor. In some embodiments, the device formation component 506 can perform a desired wet etching process to remove the desired portion of the $SiO_2$ layer 650.

In some embodiments, the device formation component 506 can deposit a desired supporting material (e.g., silicon or silicon-based material) on the superconducting material that makes up the bottom electrode, including the bottom plate of the capacitor, to facilitate reinforcing the bottom plate of the capacitor to prevent or inhibit (e.g., reduce or minimize) movement of the bottom plate and maintain the integrity of the bottom plate. In certain embodiments, the electro-optomechanical quantum transducer, comprising the SiGe/Si optical ring resonator, the capacitor, and the microwave resonator, as well as the qubit and associated components and circuitry, can be formed on a single die (e.g., a single IC chip).

Figure 9:
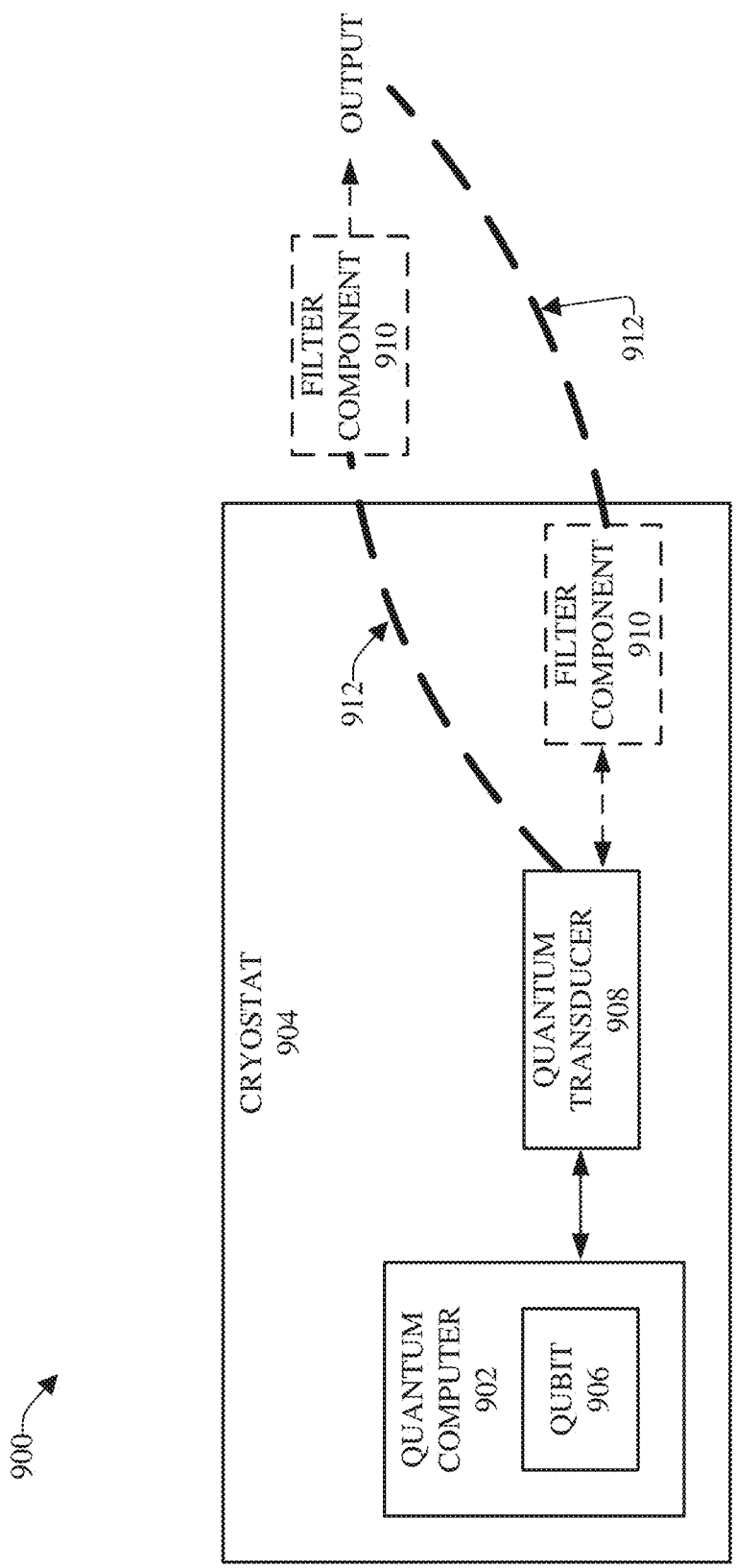
FIG. 9 depicts a block diagram of an example system that can employ a quantum transducer that can sense photons having a relatively lower microwave frequency level from a qubit and generate and transmit optical photons at a desirably higher frequency, in accordance with various aspects and embodiments of the disclosed subject matter.

FIG. 9 depicts a block diagram of an example system 900 that can employ a quantum transducer (e.g., SiGe/Si electro-optomechanical quantum transducer) that can sense photons having a relatively lower microwave frequency level from a qubit and generate and transmit optical photons at a desirably higher frequency, in accordance with various aspects and embodiments of the disclosed subject matter. The system 900 can comprise a quantum computer 902 that can be located in a cryostat 904 (e.g., inside a cryostat chamber of the cryostat 904) that can have a desirably low temperature environment that can enable superconductivity of superconductive materials of the quantum computer 902. The quantum computer 902 can comprise qubits, such as qubit 906, and quantum transducers, such as quantum transducer 908 (e.g., an SiGe/Si electro-optomechanical quantum transducer), which can be associated with the qubits (e.g., qubit 906). In some embodiments, the qubits (e.g., qubit 906) and the quantum transducers (e.g., quantum transducer 908) can be formed on the same die.

The system 900 also can comprise a filter component 910 and an optical fiber component 912. In certain embodiments, the filter component 910 can be associated with (e.g., connected to) the outputs of the quantum transducers (e.g., quantum transducer 908) at the input of the filter component 910 and the optical fiber component 912 at the output of the filter component 910. In such embodiments, the filter component 910 can reside within the cryostat 904 with the quantum computer 902 and quantum transducers (e.g., quantum transducer 908), and a first portion of the optical fiber component 912 can be located within the cryostat 904 (e.g., in a very low temperature environment) and a second portion of the optical fiber component 912 can be located outside of the cryostat 904 (e.g., in a room temperature environment). In other embodiments, the optical fiber component 912 can be associated with (e.g., connected to) the outputs of the quantum transducers and an output of the optical fiber component 912 can be associated with the input of the filter component 910. In these embodiments, the filter component 910 can be located outside of the cryostat 904 (e.g., in a room temperature environment), and a first portion of the optical fiber component 912 can be located within the cryostat 904 (e.g., in a very low temperature environment) and a second portion of the optical fiber component 912 can be located outside of the cryostat 904 (e.g., in a room temperature environment).

The quantum transducer 908 can sense photons at a relatively lower microwave frequency associated with or produced by the qubit 906, and through the electro-optomechanical quantum transducer process described herein, can generate up-converted or down-converted optical photons at a relatively higher frequency than the microwave frequency, wherein the up-converted optical photons can have a relatively higher frequency than pump optical photons that can be circulating in the optical resonator of the quantum transducer 908 and a higher frequency than the microwave photons sensed from the qubit 906, and/or wherein the down-converted optical photons can have a relatively lower frequency than pump optical photons and a higher frequency than the microwave photons sensed from the qubit 906, such as described herein. The filter component 910 can be or can comprise an optical filter that can desirably filter the pump optical photons and the up-converted or down-converted optical photons to filter out the pump optical photons and produce the up-converted or down-converted optical photons as an output from the filter component 910. The up-converted or down-converted optical photons can be analyzed or utilized for desired applications (e.g., analyzed or interpreted to determine the state or the charge of the qubit 906, analyzed or interpreted to determine quantum results of quantum operations performed on data by the quantum computer 902, analyzed or interpreted for another desired application, and/or transferred to another quantum computer for further analysis or processing), such as described herein.

The optical fiber component 912 (whether placed between the quantum transducers and the filter component 910, or placed at the output of the filter component 910) can comprise a group of optical fibers, comprising one or more optical fibers, that can be utilized to transmit optical photons, such as the up-converted or down-converted optical photons and/or the pump optical photons, from inside of the cryostat chamber of the cryostat 904 (e.g., at a very low temperature environment) to outside of the cryostat 904 (e.g., at a room temperature or relatively higher temperature environment).

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
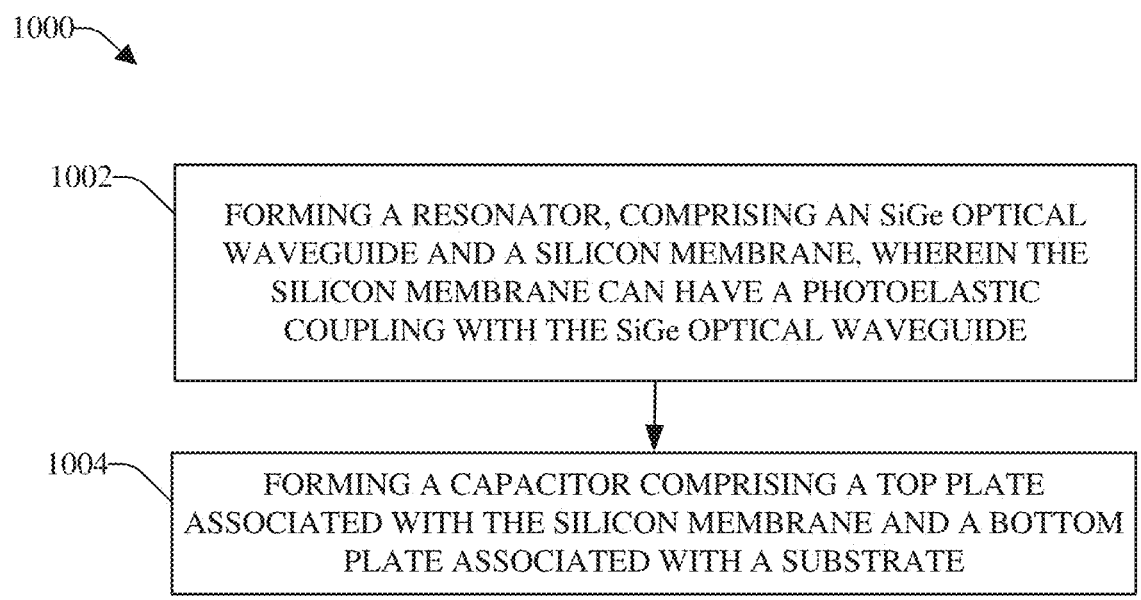
FIG. 10 illustrates a flow diagram of an example, non-limiting method that can form a quantum transducer comprising a resonator that can comprise an optical waveguide and a silicon membrane that can have a photoelastic coupling to each other, in accordance with various aspects and embodiments of the disclosed subject matter.

FIG. 10 illustrates a flow diagram of an example, non-limiting method 1000 that can form a quantum transducer (e.g., an SiGe/Si electro-optomechanical quantum transducer) comprising a resonator that can comprise an SiGe optical waveguide and a silicon membrane that can have a photoelastic coupling to each other, in accordance with various aspects and embodiments of the disclosed subject matter. The method 1000 can be performed by, for example, a system (e.g., computer system) comprising or operatively coupled to a device formation component, a processor component, and a memory. Repetitive description of like elements employed in other embodiments described herein is or may be omitted for sake of brevity.

At 1002, a resonator, comprising an SiGe optical waveguide and a silicon membrane, can be formed, wherein the silicon membrane can have a photoelastic coupling with the SiGe optical waveguide. At 1004, a capacitor, comprising a top plate associated with the silicon membrane and a bottom plate associated with a substrate, can be formed. The device formation component can form the resonator on, and dispose the resonator over, the substrate, which can be a silicon-based substrate. The device formation component can form the resonator (e.g., an SiGe/Si optical ring resonator) to comprise the SiGe optical waveguide and the silicon membrane (e.g., a strained or unstrained silicon membrane), which can have the photoelastic coupling with the SiGe optical waveguide. For instance, the SiGe optical waveguide can have a photoelastic, strained, and/or radiation pressure coupling with the silicon membrane based on the interaction or relationship between the silicon membrane and the SiGe optical waveguide. In some embodiments, the SiGe optical waveguide can be associated with an electrode (e.g., a superconducting electrode) that can be a plate (e.g., top plate) of a capacitor (e.g., parallel plate capacitor) that can be formed on the silicon membrane in proximity to the SiGe optical waveguide, wherein the other (e.g., bottom) plate (e.g., another superconducting electrode) of the capacitor can be formed in a hole region associated with a recessed region that can be formed in a backside of the substrate, wherein, during the forming of the recessed region, the hole region can be formed in the front side (e.g., top side) of the substrate in proximity to (e.g., positioned or located in proximity to) the top plate of the capacitor and the associated portion of the silicon membrane, such as described herein.

Figure 11:
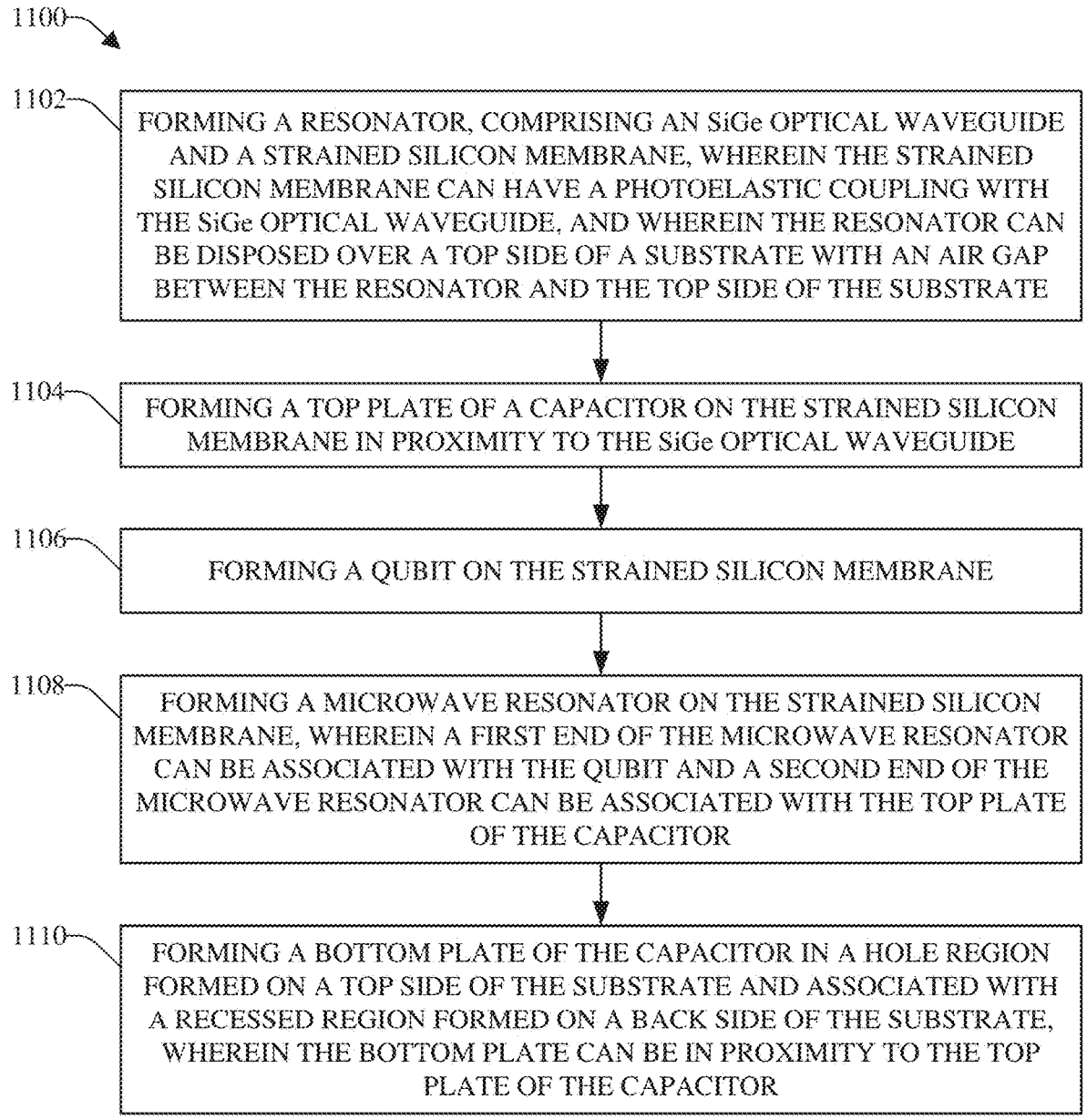
FIG. 11 depicts a flow diagram of an example, non-limiting method that can form a quantum transducer comprising a resonator, which can comprise an optical waveguide and a strained silicon membrane that can have a photoelastic coupling to each other, and a capacitor, and can be associated with a qubit and other associated components and circuitry, in accordance with various aspects and embodiments of the disclosed subject matter.

FIG. 11 depicts a flow diagram of an example, non-limiting method 1100 that can form a quantum transducer (e.g., an SiGe/Si electro-optomechanical quantum transducer) comprising a resonator, which can comprise an SiGe optical waveguide and a strained silicon membrane that can have a photoelastic coupling to each other, and a capacitor, and can be associated with a qubit and other associated components and circuitry, in accordance with various aspects and embodiments of the disclosed subject matter. The quantum transducer can be an electro-optomechanical quantum transducer. The method 1100 can be performed by, for example, a system (e.g., computer system) comprising or operatively coupled to a device formation component, a processor component, and a memory. Repetitive description of like elements employed in other embodiments described herein is or may be omitted for sake of brevity.

At 1102, a resonator, comprising an SiGe optical waveguide and a strained silicon membrane, can be formed, wherein the strained silicon membrane can have a photoelastic coupling, strained coupling, and/or radiation pressure coupling with the SiGe optical waveguide, and wherein the resonator can be disposed over a top side of a substrate with an air gap between the resonator and the top side of the substrate. The device formation component can form the resonator (e.g., an SiGe/Si optical ring resonator) to comprise the SiGe optical waveguide and the strained silicon membrane, which can have the photoelastic coupling, strained coupling, and/or radiation pressure coupling with the SiGe optical waveguide, where the resonator can be disposed over the top side of the substrate (e.g., silicon-based substrate) with the air gap in between the resonator (e.g., the bottom side of the strained silicon membrane) and the top side of the substrate.

At 1104, a top plate of a capacitor can be formed on the strained silicon membrane in proximity to the SiGe optical waveguide. The device formation component can form the top plate (e.g., a superconducting electrode) of the capacitor on the strained silicon membrane in proximity to the SiGe optical waveguide (e.g., adjacent and in relatively close proximity to the SiGe optical waveguide, or within the ring of the SiGe optical waveguide), such as described herein.

At 1106, a qubit can be formed on the strained silicon membrane. At 1108, a microwave resonator can be formed on the strained silicon membrane, wherein a first end of the microwave resonator can be associated with the qubit and a second end of the microwave resonator can be associated with the top plate of the capacitor. The device formation component can form the qubit (e.g., at least a portion of the qubit) and the microwave resonator of a desired superconducting material (e.g., Nb, Al, an Nb- or Al-based superconducting material, or another desired superconducting material). As part of forming the qubit, the device formation component can form at least one Josephson junction in the qubit. In some embodiments, as part of forming the qubit, the device formation component can form a qubit capacitor (e.g., shunt capacitor) and/or other components that can be associated with the at least one Josephson junction. The microwave resonator can be situated between, and connected to (e.g., electronically connected to), the qubit and the top plate of the capacitor.

At 1110, a bottom plate of the capacitor can be formed in a hole region formed on a top side of the substrate and associated with a recessed region formed on a back side of the substrate, wherein the bottom plate can be in proximity to the top plate of the capacitor. The device formation component can form a recessed region in the back side of the substrate. In some embodiments, the device formation component can form the recessed region by removing substrate material along a desired silicon plane (e.g., Si[111] plane, Si[110] plane, Si[100], or other desired silicon plane) of the substrate. The removal of this portion of the substrate can form the hole region in the top side of the substrate underneath and in proximity to (e.g., within a desired defined distance of) the top plate of the capacitor and associated portion of the strained silicon membrane. The device formation component can deposit a desired superconducting material along the remaining portion of the substrate that defines the recessed region and across the hole region formed in the substrate to form the bottom plate (e.g., bottom electrode) of the capacitor.

In some embodiments, the device formation component can deposit a desired supporting material (e.g., silicon or silicon-based material) on the superconducting material that makes up the bottom electrode to facilitate reinforcing the bottom plate of the capacitor to prevent or inhibit (e.g., reduce or minimize) movement of the bottom plate and maintain the integrity of the bottom plate. In certain embodiments, the quantum transducer (e.g., electro-optomechanical quantum transducer), comprising the SiGe/Si optical ring resonator, the capacitor, and the microwave resonator, as well as the qubit and associated components and circuitry, can be formed on a single die (e.g., a single IC chip).

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 12:
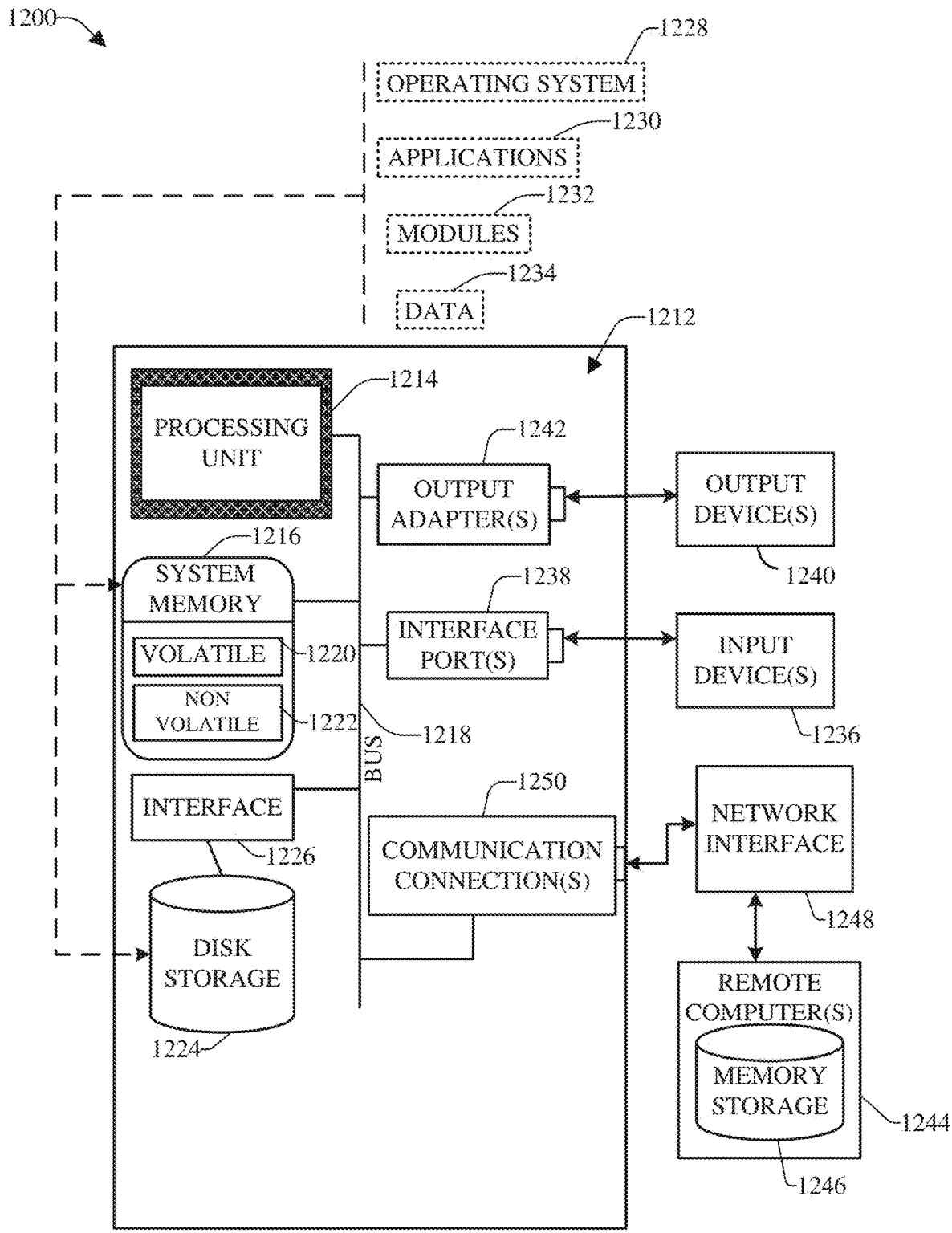
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is or may be omitted for sake of brevity. With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device (s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device (s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a method of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a resonator comprising a silicon-germanium optical waveguide and a silicon membrane that has a photoelastic coupling with the silicon-germanium optical waveguide; and
   a capacitor comprising a top plate associated with the silicon membrane and a bottom plate associated with a substrate.

2. The system of claim 1, wherein the resonator is over the substrate, and wherein the top plate and the bottom plate of the capacitor are separated by a gap between the silicon membrane and the substrate.

3. The system of claim 1, wherein the silicon membrane is a strained silicon membrane, and wherein the system further comprises:
   a microwave resonator associated with the top plate of the capacitor, wherein the resonator comprises the microwave resonator, wherein the microwave resonator is operable to sense photons at a microwave frequency level, wherein the photons facilitate causing motion of the top plate, wherein the motion of the top plate causes corresponding motion of the strained silicon membrane, wherein the corresponding motion of the strained silicon membrane changes a strain of the silicon-germanium optical waveguide, and wherein the change in the strain changes a refractive index associated with the silicon-germanium optical waveguide.

4. The system of claim 3, wherein pump optical photons of a first frequency level that are circulating in the silicon-germanium optical waveguide are up-converted or down-converted to optical photons of a second frequency level based on the change in the refractive index, and wherein the second frequency level is higher or lower than the first frequency level and higher than the microwave frequency level.

5. The system of claim 3, further comprising:
an electrode, wherein a front side of the substrate faces the resonator, wherein a back side of the substrate comprises a recessed region that extends through the substrate to a hole region in the front side of, and defined by, the substrate, wherein a surface of the substrate that defines the recessed region is along a defined silicon plane of the substrate, wherein a first portion of the electrode is on the surface, wherein a second portion of the electrode is in the hole region and is the bottom plate of the capacitor, and wherein the electrode, the capacitor, and the microwave resonator are comprised of a superconductive material.

6. The system of claim 3, further comprising an electro-optomechanical quantum transducer comprising the silicon-germanium optical waveguide, the strained silicon membrane, the substrate, the capacitor, and the microwave resonator that are integrated on a single integrated circuit die, and wherein the resonator, comprising the silicon-germanium optical waveguide and the strained silicon membrane, is a nanomechanical resonator.

7. The system of claim 1, wherein the silicon membrane comprises a strained silicon material that is crystalline, wherein a portion of the silicon membrane has a phononic crystal membrane structure, and wherein the silicon membrane has the photoelastic coupling, a strained coupling, or a radiation pressure coupling with the silicon-germanium optical waveguide.

8. The system of claim 1, wherein the silicon membrane is coupled to the silicon-germanium optical waveguide to couple the silicon-germanium optical waveguide to an electrical subsystem to facilitate electro-optic transduction.

9. The system of claim 1, wherein the resonator is a silicon-germanium, silicon optical ring resonator that comprises a silicon-germanium core component, comprising the silicon-germanium optical waveguide, coupled to a silicon cladding structure of the silicon membrane.

10. The system of claim 9, wherein the silicon cladding structure is epitaxially grown to produce a grown silicon cladding structure of the silicon membrane that embeds the silicon-germanium optical waveguide within the silicon membrane.

11. The system of claim 1, wherein an optomechanical portion of the system comprises the resonator on a first defect associated with a phononic crystal membrane structure of the silicon membrane, wherein an electromechanical portion of the system comprises the top plate of the capacitor on a second defect associated with the phononic crystal membrane structure of the silicon membrane that is separate from the first defect, and wherein the resonator is mechanically coupled to the capacitor via the silicon membrane.

12. The system of claim 1, wherein the top plate of the capacitor is on the silicon membrane and within or over a ring portion of the silicon-germanium optical waveguide, and wherein the top plate and the silicon-germanium optical waveguide are on a defect associated with a phononic crystal membrane structure of the silicon membrane.

13. The system of claim 12, wherein a bridge component is connected to the top plate of the capacitor, extends upward from the top plate, spans over and across the ring portion of the silicon-germanium optical waveguide, and extends downward to connect to a superconductive lead outside of and in proximity to the ring portion of the silicon-germanium optical waveguide, and wherein the top plate of the capacitor is connected to a microwave resonator via the bridge component and the superconductive lead.

14. The system of claim 12, wherein the capacitor is a first capacitor, and wherein the system further comprises a second capacitor in series with the first capacitor, wherein the bottom plate is a first bottom plate of the first capacitor, wherein a front side of the substrate faces the resonator, wherein a back side of the substrate comprises a recessed region that extends through the substrate to a hole region in the front side of the substrate, wherein a first surface of the substrate that partially defines the recessed region is along a defined silicon plane of the substrate, wherein a second surface of the substrate that partially defines the recessed region is along the defined silicon plane of the substrate, wherein a first electrode is partially on the first surface and extends into a first portion of the hole region to be the first bottom plate in proximity to the top plate as part of the first capacitor, and wherein a second electrode is partially on the second surface and extends into a second portion of the hole region to be a second bottom plate in proximity to the top plate as part of the second capacitor.

15. A device, comprising:
a resonator comprising a silicon-germanium optical waveguide and a silicon membrane that has a strained coupling with the silicon-germanium optical waveguide; and
a capacitor comprising a top plate associated with the silicon membrane and a bottom plate associated with a substrate.

16. The device of claim 15, further comprising:
the substrate, wherein the resonator is over the substrate, wherein the top plate of the capacitor is over the bottom plate, and wherein the top plate and the bottom plate are separated by a gap between the silicon membrane and the substrate; and
a microwave resonator associated with the top plate of the capacitor, wherein the microwave resonator is usable to sense photons at a microwave frequency level.

17. The device of claim 16, further comprising an electrode, wherein a front side of the substrate faces the resonator, wherein a back side of the substrate comprises a recessed region that extends through the substrate to a hole region in the front side of, and defined by, the substrate, wherein a surface of the substrate that defines the recessed region is along a (111) plane, a (110) plane, or a (100) plane of the substrate, wherein a first portion of the electrode is on the surface, wherein a second portion of the electrode is in the hole region and is the bottom plate of the capacitor, and wherein the electrode, the capacitor, and the microwave resonator are comprised of a superconductive material.

18. The device of claim 16, further comprising an electro-optomechanical quantum transducer comprising the silicon-germanium optical waveguide, the silicon membrane, the substrate, the capacitor, and the microwave resonator that are integrated on a single integrated circuit die, and wherein the resonator, comprising the silicon-germanium optical waveguide and the silicon membrane, is a nanomechanical resonator.

19. The device of claim 15, wherein the silicon membrane comprises a crystalline silicon material, wherein a portion of the silicon membrane has a phononic crystal membrane structure, and wherein the silicon membrane has the strained coupling, a photoelastic coupling, or a radiation pressure coupling with the silicon-germanium optical waveguide; and wherein the resonator is a nanomechanical silicon-germanium, silicon optical ring resonator that comprises a silicon-germanium core component, comprising the silicon-germanium optical waveguide, coupled to a silicon cladding structure of the silicon membrane.

20. A method, comprising:
   forming a resonator comprising a silicon-germanium optical waveguide and a silicon membrane, wherein the silicon membrane has a photoelastic coupling with the silicon-germanium optical waveguide; and
   forming a capacitor comprising a top plate associated with the silicon membrane and a bottom plate associated with a substrate.

* * * * *